(12) United States Patent
Hu et al.

(10) Patent No.: US 12,151,231 B1
(45) Date of Patent: Nov. 26, 2024

(54) HIGH-ENTROPY ALLOY (HEA) CATALYSTS, METHODS OF FORMING HEA CATALYSTS, AND METHODS OF USING HEA CATALYSTS

(71) Applicants: UNIVERSITY OF MARYLAND, COLLEGE PARK, College Park, MD (US); THE JOHNS HOPKINS UNIVERSITY, Baltimore, MD (US)

(72) Inventors: Liangbing Hu, Rockville, MD (US); Chao Wang, Baltimore, MD (US); Pengfei Xie, Baltimore, MD (US); Yonggang Yao, College Park, MD (US)

(73) Assignees: University of Maryland, College Park, College Park, MD (US); The Johns Hopkins University, Baltimore, MD (US)

( * ) Notice: Subject to any disclaimer, the term of this patent is extended or adjusted under 35 U.S.C. 154(b) by 334 days.

(21) Appl. No.: 17/466,781

(22) Filed: Sep. 3, 2021

Related U.S. Application Data

(60) Provisional application No. 63/075,003, filed on Sep. 4, 2020.

(51) Int. Cl.
    *B01J 23/755*    (2006.01)
    *B01J 21/18*     (2006.01)
    (Continued)

(52) U.S. Cl.
    CPC ............ *B01J 23/755* (2013.01); *B01J 21/18* (2013.01); *B01J 23/28* (2013.01); *B01J 23/72* (2013.01);
    (Continued)

(58) Field of Classification Search
None
See application file for complete search history.

(56) References Cited

U.S. PATENT DOCUMENTS

| | | | |
|---|---|---|---|
| 11,193,191 B2 | 12/2021 | Yao et al. | |
| 11,369,929 B2 | 6/2022 | Hu et al. | |
| | (Continued) | | |

FOREIGN PATENT DOCUMENTS

| | | |
|---|---|---|
| WO | WO 2020/236767 A1 | 11/2020 |
| WO | WO 2020/252435 A1 | 12/2020 |
| | (Continued) | |

OTHER PUBLICATIONS

Huang et al., Molybdenum-modified and vertex-reinforced quaternary hexapod nanoskeletons as efficient electrocatalysts for methanol oxidation and oxygen reduction reaction, Applied Catalysis B: Environmental 258, 2019 (Year: 2019).*

(Continued)

*Primary Examiner* — Melissa S Swain
*Assistant Examiner* — Keling Zhang
(74) *Attorney, Agent, or Firm* — RowanTree Law Group, PLLC; Frederick F. Rosenberger

(57) ABSTRACT

A catalytic structure has a plurality of high-entropy alloy (HEA) nanoparticles. Each HEA nanoparticle is composed of a homogeneous mixture of elements of cobalt (Co), molybdenum (Mo), and at least two transition metal elements. For example, in some embodiments, each HEA nanoparticle is a quinary mixture of Co, Mo, iron (Fe), nickel (Ni), and copper (Cu). The homogeneous mixture in each HEA nanoparticle forms a single solid-solution phase. The catalytic structure is used to catalyze a chemical reaction, for example, ammonia decomposition or ammonia synthesis. Methods for forming the catalytic structure are also disclosed.

10 Claims, 15 Drawing Sheets

(51) Int. Cl.
  *B01J 23/28* (2006.01)
  *B01J 23/72* (2006.01)
  *B01J 23/745* (2006.01)
  *B01J 23/75* (2006.01)
  *B01J 35/00* (2006.01)
  *B01J 35/40* (2024.01)
  *B01J 37/02* (2006.01)
  *B01J 37/08* (2006.01)

(52) U.S. Cl.
  CPC .............. *B01J 23/745* (2013.01); *B01J 23/75* (2013.01); *B01J 35/19* (2024.01); *B01J 35/40* (2024.01); *B01J 37/0215* (2013.01); *B01J 37/08* (2013.01)

(56) References Cited

U.S. PATENT DOCUMENTS

| | | | |
|---|---|---|---|
| 2007/0160899 A1* | 7/2007 | Atanassova | H01M 4/921 429/535 |
| 2018/0369771 A1 | 12/2018 | Hu et al. | |
| 2019/0161840 A1 | 5/2019 | Yao et al. | |
| 2022/0219986 A1 | 7/2022 | Hu et al. | |
| 2022/0241756 A1 | 8/2022 | Hu et al. | |
| 2022/0288551 A1 | 9/2022 | Hu et al. | |

FOREIGN PATENT DOCUMENTS

| | | |
|---|---|---|
| WO | WO 2022/132883 A1 | 6/2022 |
| WO | WO 2022/204168 A1 | 9/2022 |
| WO | WO 2022/204494 A1 | 9/2022 |

OTHER PUBLICATIONS

Guo et al., Carbon nanofibers supported Pt-Ru electrocatalysts for direct methanol fuel cells, Carbon, 2006 (Year: 2006).*

Xie et al., "Highly efficient decomposition of ammonia using high-entropy alloy catalysts," *Nature Communications*, 2019, 10: 4011. (12 pages).

Bell et al., "$H_2$ Production via Ammonia Decomposition Using Non-Noble Metal Catalysts: A Review," *Top Catal*, Jul. 2016, 59: 1438-57. (20 pages).

Boisen et al., "Promotion of Binary Nitride Catalysts: Isothermal $N_2$ Adsorption, Microkinetic Model, and Catalytic Ammonia Synthesis Activity," *Journal of Catalysis*, 2002, 208: pp. 180-186. (7 pages).

Choudhary et al., "Catalytic ammonia decomposition: $CO_x$-free hydrogen production for fuel cell applications," *Catalysis Letters*, 2001, 72(3-4): pp. 197-201. (5 pages).

Duan et al., "MCM-41 supported Co—Mo bimetallic catalysts for enhanced hydrogen production by ammonia decomposition," *Chemical Engineering Journal*, Jun. 2012, 207-208: pp. 103-108. (6 pages).

Duan et al., "Understanding Co—Mo Catalyzed Ammonia Decomposition: Influence of Calcination Atmosphere and Identification of Active Phase," *ChemCatChem*, Jan. 2016, 8: pp. 938-945. (8 pages).

Ganley et al., "A priori catalytic activity correlations: the difficult case of hydrogen production from ammonia," *Catalysis Letters*, Jul. 2004, 96(3-4): pp. 117-122. (6 pages).

Guo et al., "Lithium Imide Synergy with 3d Transition-Metal Nitrides Leading to Unprecedented Catalytic Activities for Ammonia Decomposition," *Agnew. Chem. Int. Ed.*, 2015, 54: pp. 2950-2954. (5 pages).

Hansgen et al., "Using first principles to predict bimetallic catalysts for the ammonia decomposition reaction," *Nature Chemistry*, Jun. 2010, 2: pp. 484-489. (6 pages).

Ju et al., "Mesoporous Ru/MgO prepared by a deposition-precipitation method as highly active catalyst for producing $CO_x$-free hydrogen from ammonia decomposition," *Applied Catalysis B: Environmental*, Apr. 2017, 211: pp. 167-175. (9 pages).

Leybo et al., "Effects of composition and production route on structure and catalytic activity for ammonia decomposition reaction of ternary Ni—Mo nitride catalysts," *International Journal of Hydrogen Energy*, Jan. 2016, 41: pp. 3854-3860. (7 pages).

Li et al., "Catalytic Ammonia Decomposition over High-Performance Ru/Graphene Nanocomposites for Efficient $CO_x$-Free Hydrogen Production," *Catalysts*, 2017, 7(23): catal7010023. (12 pages).

Lorenzut et al., "FeMo-based catalysts for $H_2$ production by $NH_3$ decomposition," *Applied Catalysis B: Environmental*, Jun. 2012, 125: pp. 409-417. (9 pages).

Mukherjee et al., "Low-temperature ammonia decomposition catalysts for hydrogen generation," *Applied Catalysis B: Environmental*, 2018, 226: pp. 162-181. (20 pages).

Podila et al., "Hydrogen production by ammonia decomposition using high surface area $Mo_2N$ and $Co_3Mo_3N$ catalysts," *Catalysis Science & Technology*, 2016, 6: pp. 1496-1506. (11 pages).

Prasad et al., "Assessment of Overall Rate Expressions and Multiscale, Microkinetic Model Uniqueness via Experimental Data Injection: Ammonia Decomposition on Ru/$\gamma$-$Al_2O_3$ for Hydrogen Production," *Ind. Eng. Chem. Res.*, Apr. 2009, 48: pp. 5255-5265. (11 pages).

Rosowski et al., "The temperature-programmed desorption of $N_2$ from a Ru/MgO catalyst used for ammonia synthesis," *Catalysis Letters*, 1996, 36: pp. 229-235. (7 pages).

Schuth et al., "Ammonia as a possible element in an energy infrastructure: catalysts for ammonia decomposition," *Energy & Environmental Science*, 2012, 5: pp. 6278-6289. (12 pages).

Simonsen et al., "Alloyed Ni—Fe nanoparticles as catalysts for $NH_3$ decomposition," *Applied Catalysis A: General*, Sep. 2012, 447-448: pp. 22-31. (10 pages).

Srifa et al., "Hydrogen production by ammonia decomposition over Cs-modified $Co_3Mo_3N$ catalysts," *Applied Catalysis B: Environmental*, Jun. 2017, 218: pp. 1-8. (8 pages).

Yao et al., "Carbothermal shock synthesis of high-entropy-alloy nanoparticles," *Science*, Mar. 2018, 359: pp. 1489-1494. (6 pages).

Yin et al., "A mini-review on ammonia decomposition catalysts for on-site generation of hydrogen for fuel cell applications," *Applied Catalysis A: General*, Oct. 2004, 277: pp. 1-9. (9 pages).

Yin et al., "Carbon nanotubes-supported Ru catalyst for the generation of $CO_x$-free hydrogen from ammonia," *Catalysis Today*, Jul. 2004, 93-95: pp. 27-38. (12 pages).

Yin et al., "Investigation on the catalysis of $CO_x$-free hydrogen generation from ammonia," *Journal of Catalysis*, Apr. 2004, 224: pp. 384-396. (13 pages).

* cited by examiner

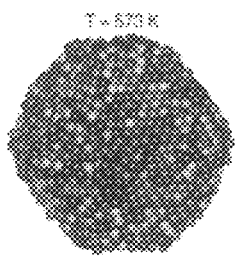
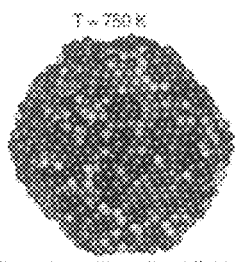
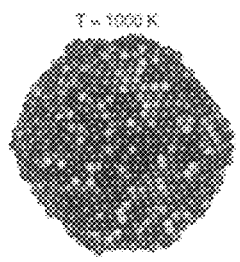
FIG. 14A      FIG. 14B      FIG. 14C
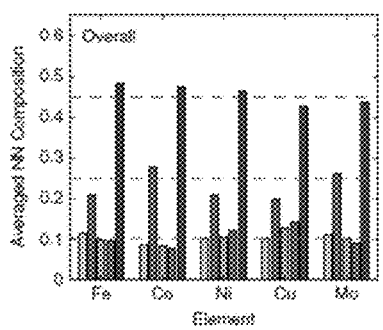
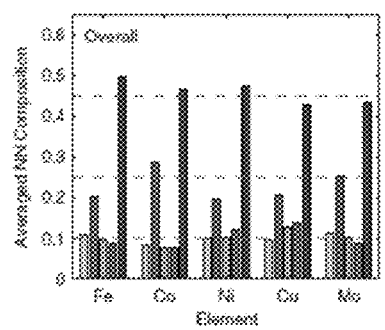
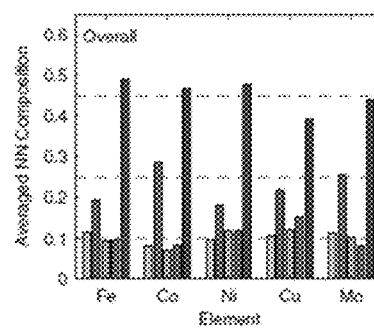
FIG. 15A      FIG. 15B      FIG. 15C
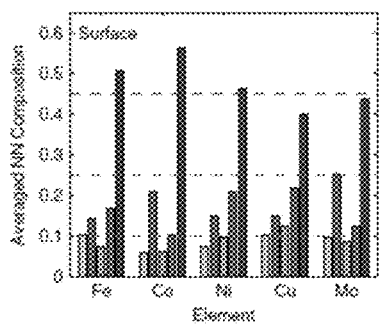
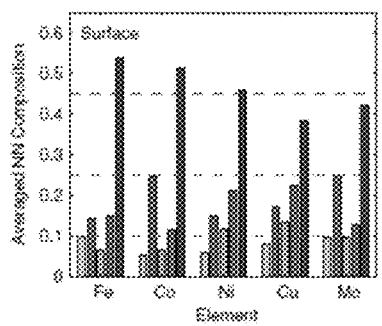
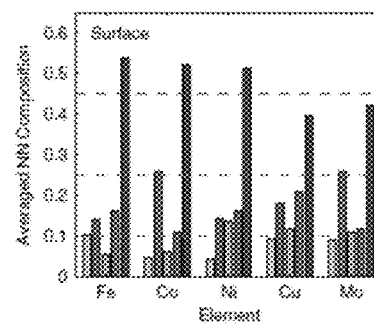
FIG. 16A      FIG. 16B      FIG. 16C

HIGH-ENTROPY ALLOY (HEA) CATALYSTS, METHODS OF FORMING HEA CATALYSTS, AND METHODS OF USING HEA CATALYSTS

CROSS-REFERENCE TO RELATED APPLICATION

The present application claims the benefit of U.S. Provisional Application No. 63/075,003, filed Sep. 4, 2020, entitled "High-Entropy Alloy Catalysts and Methods of Making and Using the Same," which hereby is incorporated by reference herein in its entirety.

STATEMENT REGARDING FEDERALLY SPONSORED RESEARCH

This invention was made with government support under DE-AR0000952 awarded by the U.S. Department of Energy. The government has certain rights in the invention.

FIELD

The present disclosure relates generally to catalysts, and more particularly, to high-entropy alloy (HEA) catalysts, and methods of forming and using such HEA catalysts.

BACKGROUND

The ammonia ($NH_3$) decomposition reaction has received increasing attention for the potential use of $NH_3$ as a hydrogen storage medium. $NH_3$ can be readily liquefied at a mild pressure of ~8 bar at room temperature, giving rise to an energy density of 4.25 kWh/L. Ruthenium (Ru) has been used to catalyze the decomposition of $NH_3$, but its large-scale application is limited due to its scarcity and high cost. Bimetallic cobalt-molybdenum (Co—Mo) has shown promise for catalyzing ammonia decomposition. However, the functional tuning and catalytic activity of Co—Mo catalysts are largely constrained by the large miscibility gap present in its phase diagram. Fabricated catalysts have thus been limited to elemental ratios around one (Co/Mo≈1). Embodiments of the disclosed subject matter may address one or more of the above-noted problems and disadvantages, among other things.

SUMMARY

Embodiments of the disclosed subject matter system provide multi-element high entropy alloy (HEA) nanoparticles that can be used as a catalyst in thermochemical reactions, for example, ammonia decomposition and/or ammonia synthesis reactions. In embodiments, the HEA nanoparticles are formed using a thermal shock synthesis process, such that at least four elements are combined as a homogeneous mixture. For example, the HEA nanoparticles are comprised of a homogeneous mixture of cobalt (Co), molybdenum (Mo), and at least two transition metal elements (e.g., 3d transition metal elements, such as iron (Fe), nickel (Ni), copper (Cu), and manganese (Mn)) that forms a single solid-solution phase. The combination of transition metal elements with Co and Mo in a single solid-solution phase can allow robust control over the Co/Mo atomic ratio, including those ratios considered to be immiscible according to the Co—Mo bimetallic phase diagram. The catalytic activity of HEA nanoparticles can be custom tuned by varying the Co/Mo ratio in fabrication, thereby allowing for optimization of surface properties of the catalyst to maximize, or at least increase, reactivity under different reaction conditions. Such Co—Mo HEA nanoparticles can demonstrate substantially enhanced activity and stability as compared to conventional catalysts, for example, in ammonia decomposition.

In one or more embodiments, a catalytic structure can comprise a plurality of HEA nanoparticles. Each HEA nanoparticle can have a maximum cross-sectional dimension less than or equal to 1 μm, and can comprise a homogeneous mixture of elements of cobalt (Co), molybdenum (Mo), and at least two transition metal elements. For example, in some embodiments, each HEA nanoparticle can be a quinary mixture of Co, Mo, Fe, Ni, and Cu. In one or more embodiments, the homogeneous mixture can form a single solid-solution phase. In some embodiments, a ratio of Co to Mo in the HEA nanoparticle may be at a value that would otherwise be immiscible for a bimetallic alloy of Co and Mo with the same ratio.

In one or more embodiments, a method can comprise providing a catalyst. The catalyst can comprise a plurality of HEA nanoparticles. The method can further comprise heating one or more reactants at a first temperature, while contacting with the catalyst, to perform a chemical reaction that converts the one or more reactants to one or more products. In some embodiments, the chemical reaction can comprise an ammonia decomposition reaction or an ammonia synthesis reaction.

In one or more embodiments, a method for fabricating a catalytic structure can comprise loading a plurality of precursor metal salts onto a carbon-based substrate. The plurality of precursor metal salts can comprise a first metal salt of Co, a second metal salt of Mo, a third metal salt of a first transition metal element, and a fourth metal salt of a second transition metal element. The method can further comprise heating the loaded substrate at a heating rate to a first temperature, and maintaining the loaded substrate at the first temperature for a first time. The method can also comprise, after the first time, cooling the substrate at a cooling rate from the first temperature. After the cooling, a plurality of HEA nanoparticles can be formed on the substrate.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIGS. 14A-14C show atomistic models of $Co_{25}Mo_{45}Fe_{10}Ni_{10}Cu_{10}$ nanoparticles predicted using Monte-Carlo simulations for temperatures of 573 K, 750 K, and 1000 K, respectively.

FIGS. 15A-15C are graphs of composition of first-nearest neighbor (NN) lattice sites around a specific element averaged over all atoms in the corresponding $Co_{25}Mo_{45}Fe_{10}Ni_{10}Cu_{10}$ nanoparticle, as predicted using Monte-Carlo simulations for temperatures of 573 K, 750 K, and 1000 K, respectively.

FIGS. 16A-16C are graphs of composition of first-nearest neighbor (NN) lattice sites around a specific element averaged over surface atoms in the corresponding $Co_{25}Mo_{45}Fe_{10}Ni_{10}Cu_{10}$ nanoparticle, as predicted using Monte-Carlo simulations for temperatures of 573 K, 750 K, and 1000 K, respectively.

DETAILED DESCRIPTION

General Considerations

Figure 1A:
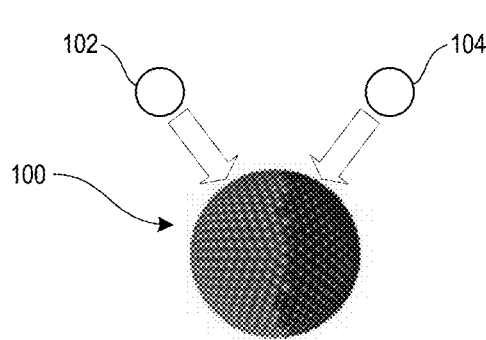
FIG. 1A is a simplified schematic diagram illustrating aspects of a conventional bimetallic Co—Mo particle.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved.

The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of skill in the art to have a more definitive construction, the numerical parameters set forth are approximations that may depend on the desired properties sought and/or limits of detection under standard test conditions/methods, as known to those of skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one of skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those of skill in the art in the practice of the disclosed subject matter.

Nanoparticle: A particle formed of a plurality of elements (e.g., at least 4 elements) and having a maximum cross-sectional dimension, D, (e.g., diameter when the particle is spherical) less than or equal to 1 µm. In some embodiments, each nanoparticle has a maximum cross-sectional dimension of 100 nm or less, for example, 25 nm or less. In some embodiments, each nanoparticle is spaced from an adjacent nanoparticle (e.g., having substantially the same composition) by at least 10 nm, for example, ~10 nm to ~100 nm.

Introduction

Disclosed herein is a novel class of high-entropy alloy (HEA) catalysts that can be used in thermochemical reactions, such as ammonia decomposition and ammonia synthesis. In some embodiments, the HEA catalysts are grown as nanoparticles using a thermal shock fabrication, where very high temperatures (e.g., at least 1400 K, such as ≥2000 K) are achieved over a short duration (e.g., less than 500 ms, such as less than 100 ms) with rapid ramping to/from temperature (e.g., at least $10^3$ K/s, such as ≥$10^5$ K/s). Each HEA nanoparticle can be formed of a homogeneous mixture of multiple elements (e.g., at least four, such as five or more) that forms a single solid-solution phase. In some embodiments, the homogenous mixture includes cobalt (Co) and molybdenum (Mo).

Figure 1B:
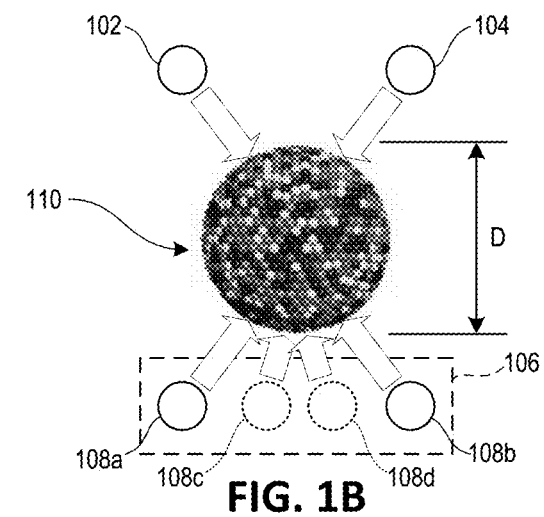
FIG. 1B is a simplified schematic diagram illustrating aspects of a Co—Mo high-entropy alloy (HEA) nanoparticle, according to one or more embodiments of the disclosed subject matter.

Referring to FIG. 1A, a simplified illustration of a bimetallic Co—Mo particle 100 is shown. The bimetallic particle 100 can be formed of a plurality of Co atoms 102 and a plurality of Mo atoms 104. However, such bimetallic Co—Mo particles are largely constrained by the large miscibility gap present in the phase diagram of this binary alloy. Thus, bimetallic Co—Mo particles have been limited to elemental ratios around one, which accordingly limits the ability to optimize particle composition for catalytic activity with respect to a particular thermochemical reaction and/or reaction conditions. In contrast, the miscibility limitation for Co—Mo alloys can be overcome and the Co/Mo ratio arbitrarily tuned by fabricating multi-element alloy nanoparticles using a thermal shock fabrication process, according to embodiments of the disclosed subject matter Referring to FIG. 1B, a simplified illustration of a Co—Mo HEA nanoparticle 110 is shown. The nanoparticle 110 can be formed of a plurality of Co atoms 102 and a plurality of Mo atoms 104 in combination with at least two atomic elements 108a, 108b selected from a group 106 of transition metal elements. In some embodiments, the transition metal elements of group 106 are 3d transition metals, for example, at least two elements selected from iron (Fe), nickel (Ni), copper (Cu), and manganese (Mn). In some embodiments, more than two atomic elements 108a, 108b can be selected from the group 106 of transition metal elements. For example, atomic element 108c can additionally be selected to form a quinary mixture, or atomic elements 108c, 108d can additionally be selected to form a senary mixture. In some embodiments, the atomic elements 102, 104, 108a, 108b, 108c, and/or 108d are selected to provide an atomic size difference, δ, and/or an enthalpy of mixing, $\Delta H_{mix}$, that forms, or is inclined to form, an HEA. For example, the atomic elements can be selected such that δ≤6.6% and/or ~11.6<$\Delta H_{mix}$<3.2 kJ/mol.

In some embodiments, the HEA nanoparticle 110 is formed as a quinary mixture that forms a single solid-solution phase, for example, a face-centered cubic phase. For example, the HEA nanoparticle 110 can be formed of a mixture of Co, Mo, Fe, Ni, and Cu that satisfies the formula $Co_xMo_yFe_aNi_bCu_c$, where x+y=100−(a+b+c), and 10≤a, b, c≤20. In some embodiments, a, b, and c can be the same as each other (e.g., a=b=c=10) or different from each other.

In some embodiments, the HEA nanoparticles 110 can be used as a catalyst in a thermochemical reaction, for example, a reaction involving ammonia ($NH_3$), such as an ammonia decomposition reaction or an ammonia synthesis reaction. Since the composition of the HEA nanoparticles 110 can be customized during the thermal shock fabrication process without the miscibility limitations of bimetallic Co—Mo particles, surface properties of the HEA nanoparticles 110 (and their corresponding catalytic activity) can be better matched to reaction process conditions (e.g., ammonia concentration). Such compositional tailoring of the HEA nanoparticles 110 (e.g., anywhere from Co>>Mo to Co<<Mo) can yield significantly enhanced catalytic activity and stability as compared to conventional catalysts, for example, an improvement factor exceeding 20 times as compared to conventional ruthenium (Ru) catalysts. In some embodiments, the catalytic activity and kinetics of the HEA nanoparticles 110 can exhibit a volcano-type behavior substantially independent of the Co/Mo ratio.

Catalytic Structures

In some embodiments, the HEA nanoparticles 110 can be supported on and/or integrated with a substrate to form a catalytic structure. In some embodiments, the substrate can be the same structure used to initially form the nanoparticles from a plurality of precursors (e.g., metal salts) loaded thereon and subsequently heated. For example, in some embodiments, the substrate can be a carbon-based structure and can serve as the heating element for the thermal shock process. Alternatively or additionally, the substrate can be disposed in thermal communication (e.g., conductive, convective, or radiative) with a heating element that provides the desired thermal shock to convert the precursors into a plurality of separated nanoparticles (e.g., with a minimum spacing, S, between adjacent nanoparticles 110 being varying from ~10 nm to ~100 nm).

Figure 1C:
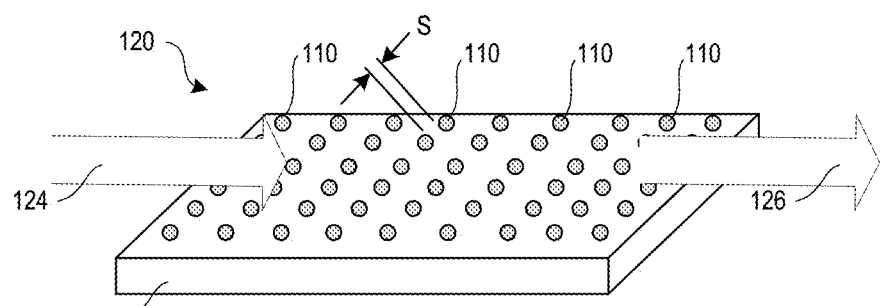
FIG. 1C is a simplified schematic diagram of a catalytic structure employing Co—Mo HEA nanoparticles, according to one or more embodiments of the disclosed subject matter.

Referring to FIG. 1C, a simplified illustration of an exemplary catalytic structure 120 is shown. In the illustrated example, the catalytic structure 120 has a substrate 122 with a random array of HEA nanoparticles 110 with substantially the same mixture composition. In some embodiments, the substrate 122 can be a carbon-based structure and can serve as a heating element to provide the high temperature (e.g., ≥300° C.) that drives the thermochemical reaction to convert the reactants 124 into products 126. Alternatively or additionally, the substrate 122 can be disposed in thermal communication (e.g., conductive, convective, or radiative) with a heating element that provides the elevated temperature to drive the thermochemical reaction. In operation, the reactants 124 (e.g., heated by the environment and/or substrate 122) can come into contact with exposed HEA nanoparticle catalysts 110 as the reactants 124 flow over the surface of the substrate 122. The contact with the nanoparticles 110 at high temperature (e.g., 300-600° C., inclusive e.g., ≥300° C.) allows the reactants 124 to be converted to a flow of products 126. For example, the reactants 124 can be ammonia and the products 126 can be hydrogen and nitrogen for a thermochemical reaction involving ammonia decomposition, or vice versa for a thermochemical reaction involving ammonia synthesis.

Figure 1D:
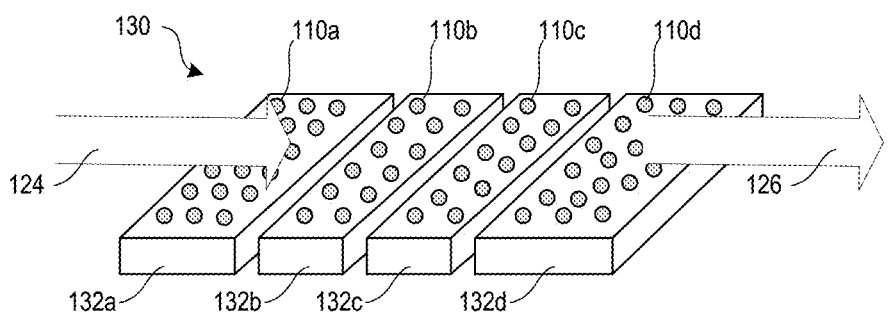
FIG. 1D is a simplified schematic diagram illustrating a catalytic structure with property gradient, according to one or more embodiments of the disclosed subject matter.

In some embodiments, it may be desirable to tailor the surface properties of HEA nanoparticles (e.g., by changing a mixture composition thereof, such as by varying the Co/Mo ratio) at different locations along the reactant flow to match corresponding reaction conditions (e.g., decrease in reactant concentration downstream due to conversion to products). For example, in some embodiments, cascaded substrates 132a-132d can be provided, each having nanoparticles 110a-110d with mixture compositions different than the other substrates, as shown in FIG. 1D. The resulting catalytic structure 130 can provide gradually changing (e.g., continuously variable or step-wise transitions) nitrogen binding strengths that match reactant 124 concentrations at corresponding locations along the flow. For example, for an ammonia decomposition reaction, at leading end proximal to inlet of reactants 124 (e.g., where ammonia concentration is expected to be higher), nanoparticles 110a can have a Co/Mo ratio with Co being greater than Mo. Conversely, at the trailing end proximal to outlet of products 126 (e.g., where ammonia concentration is expected to be lower), nanoparticles 110d can have a Co/Mo ratio with Co being less than Mo. In some embodiments, the Co/Mo ratio in one or more of the nanoparticles 110a-110d falls in a range that would otherwise be considered immiscible for a bimetallic Co—Mo particle. Although the substrates 132a-132d are shown as separate structures in FIG. 1D, in some embodiments, substrates 132a-132d can be different portions of a single continuous substrate (e.g., with different nanoparticle composition achieved by spatial control of precursor loading during the fabrication process).

In FIGS. 1C-1D, each substrate is generally shaped as a rectangular prism, with an active surface (e.g., with exposed nanoparticles 110) arranged parallel to a flow direction of reactants 124 and/or products 126. However, in some embodiments, the substrate can have a shape different than that illustrated in FIGS. 1C-1D (e.g., film, membrane, polyhedral prism, irregular-shaped structure, etc.), the substrate can have an orientation different than that illustrated in FIGS. 1C-1D (e.g., with reactant 124 and/or product 126 flows directed perpendicular to the substrate 122, for example, to flow through a porous substrate), and/or an arrangement of HEA nanoparticles 110 different than that illustrated in FIGS. 1C-1D (e.g., a regular array of HEA nanoparticles on exposed surfaces of the substrate).

Figure 1E:
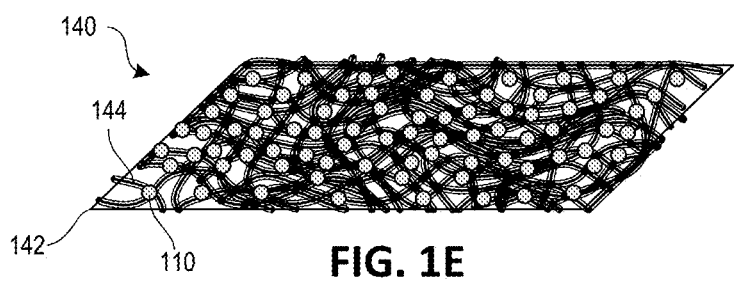
FIG. 1E is a simplified schematic diagram of a carbon-nanofiber (CNF) substrate with Co—Mo HEA nanoparticles, according to one or more embodiments of the disclosed subject matter.

For example, in some embodiments, the substrate 142 can be formed of a network of carbon nanofibers (CNFs) 144, as shown in FIG. 1E. The nanoparticles 110 can be formed directly on surfaces of the CNFs 144. Thus, some of the nanoparticles 110 may be disposed within the CNF network, while others may be considered disposed on an externally-facing surface of the CNF network (e.g. substrate 142). The resulting catalytic structure 140 can be considered porous, such that the flow of reactants 124 can be directed perpendicular to substrate 122 (e.g., to allow the reactants to contact nanoparticles 110 within the CNF network). Alternatively or additionally, reactants in FIG. 1E can be directed in a manner similar to that illustrated in FIGS. 1C-1D, e.g., substantially parallel to a main or active external surface of the substrate 142.

Fabrication and Use of Catalytic Structures

Figure 2A:
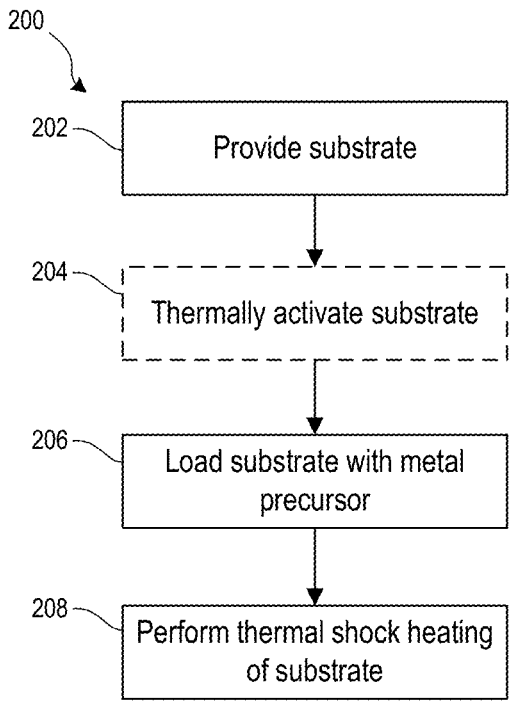
FIG. 2A is a simplified process flow diagram for a method of forming a catalytic structure, according to one or more embodiments of the disclosed subject matter.

FIG. 2A shows as an exemplary method 200 for forming a catalytic structure, such as any of structures 120, 130, and 140 of FIGS. 1B-1E. The method 200 can initiate at process block 202, where an appropriate substrate (e.g., capable of withstanding temperatures in excess of 1400K) is provided. For example, a carbon-based substrate can be provided, such as a substrate formed by a network of CNFs. Alternatively or additionally, in some embodiments, the provision of process block 202 can include fabrication of the carbon-based substrate from a starting material. For example, a polymer nanofiber network (e.g., polyacrylonitrile) can be formed by electrospinning and then carbonized (e.g., by heating at 900° C. for 2 hours) to yield the network of CNFs for subsequent use as the substrate. The method 200 can proceed to process block 204, where the provided substrate can optionally be subjected to thermal activation, which may be effective to create surface defects in the substrate, e.g., for effective nanoparticle dispersion. For example, when using CNF films as the substrate, the thermal activation can be at a temperature 750° C. for 2 hours in a carbon dioxide atmosphere.

The method 200 can proceed to process block 206, where the substrate is loaded with one or more precursors for the elements in the mixture of the desired multi-element HEA nanoparticles. In some embodiments, the precursors can include metal salts in solution (e.g., chloride salts in ethanol). As noted above, each nanoparticle 110 can be formed of Co and Mo in combination with at least two transition metal elements. Accordingly, the precursors can include Co salts (e.g., $COCl_2$), Mo salts (e.g., $MoCl_3$), and salts of at least two transition metals (e.g., $FeCl_3$, $NiCl_2$, $CuCl_2$, etc.). In some embodiments, the loading can be provided by dip coating the substrate in the precursor solution, and then drying (e.g., at room temperature). Alternatively or additionally, the loading can be via any other application method, such as, but not limited to, brushing, spraying, printing, or rolling the solution onto the substrate. The loading of precursors can mirror the desired composition for the mixture of the resulting of the nanoparticles, for example, such that a desired atomic ratio of Co/Mo is attained. In some embodiments, the concentration of elements in the precursor loading reflects a desired mixture composition for the resulting HEA nanoparticles that satisfies the formula $Co_xMo_yFe_aNi_bCu_c$, where x+y=100−(a+b+c), and 10≤a, b, c≤20.

The method 200 can proceed to process block 208, where the substrate loaded with precursors is subjected to a thermal shock process. The thermal shock process can be achieved by a pulsed heating profile, with (i) a rapid heating ramp (e.g., $>10^3$ K/s, such as $\sim 10^5$ K/s), (ii) a short dwell period (e.g., ≤500 ms, such as ≤100 ms) at or about peak temperature (e.g., ≥1400 K, such as ~2000-2300 K), and (iii) an equally-rapid cooling ramp (e.g., $\geq 10^3$ K/s, such as $\sim 10^5$ K/s). The rapid heating of the substrate (e.g., an oxygenated carbon support) can induce rapid thermal decomposition of the precursors thereon, thus forming small liquid droplets of multi-metallic solutions. The subsequent rapid cooling can enable crystallization of these liquid droplets into substantially uniform and homogeneous alloy nanoparticles without being subjected to aggregation, agglomeration, element segregation, or phase separation. Thus, a catalytic structure, which comprises the substrate and HEA nanoparticles thereon, can be produced by the thermal shock process. In some embodiments, the pulsed heating profile can be provided by passing electrical current through the substrate to provide Joule heating. Alternatively or additionally, in some embodiments, the pulsed heating profile can be provided by a separate heating element (e.g., Joule heating element) in thermal communication with the substrate to allow the substrate to experience the required elevated temperatures (e.g., ≥1400 K). Further details. Further details regarding the thermal shock process can be found in U.S. Publication No. 2019/0161840, entitled "Thermal Shock Synthesis and Multielement Nanoparticles," which is incorporated by reference herein in its entirety.

Although some of blocks 202-208 of method 200 have been described as being performed once, in some embodiments, multiple repetitions of a particular process block may be employed before proceeding to the next decision block or process block. In addition, although blocks 202-208 of method 200 have been separately illustrated and described, in some embodiments, process blocks may be combined and performed together (simultaneously or sequentially). Moreover, although FIG. 2A illustrates a particular order for blocks 202-208, embodiments of the disclosed subject matter are not limited thereto. Indeed, in certain embodiments, the blocks may occur in a different order than illustrated or simultaneously with other blocks.

In some embodiments, a system can be provided for forming a catalytic structure according to the method 200 of FIG. 2A. In some embodiments, the system can include one or more process stations corresponding to different process blocks 202-208. For example, the system can include a coating station to load the substrate with precursors, a thermal enclosure to contain the substrate during heating, and a current source with electrical connections to the substrate to effect the desired thermal shock process. In some embodiments, the system can include a controller or control module configured to control the various components of the system to perform the method 200.

Figure 2B:
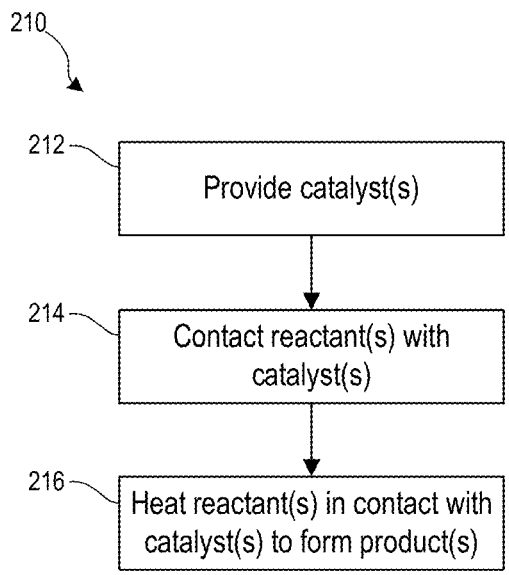
FIG. 2B is a simplified process flow diagram for a method of using the catalytic structure in a thermochemical reaction, according to one or more embodiments of the disclosed subject matter.

FIG. 2B shows an exemplary method 210 for performing a thermochemical reaction using an HEA nanoparticle as a catalyst. In some embodiments, the thermochemical reaction is one involving ammonia. For example, the thermochemical reaction can be an ammonia decomposition reaction or an ammonia synthesis reaction. The method 210 can initiate at process block 212, where the HEA nanoparticles are provided. In some embodiments, the HEA nanoparticles are supported on a substrate (e.g., a carbon-based substrate), e.g., a catalytic structure formed according to the method of FIG. 2A and/or having any one of structures 120, 130, and 140 of FIGS. 1B-1E. In some embodiments, the substrate can be used for the heating of the thermochemical reaction. For example, electrical current can be passed through the substrate to provide continuous or periodic Joule heating. In such embodiments, the providing of process block 212 can further include making electrical contact to the substrate. In some embodiments, all of the HEA nanoparticles on the substrate have substantially the same mixture composition, or at least substantially the same Co/Mo ratio. Alternatively, in some embodiments, at least some of the HEA nanoparticles on the substrate can have a different mixture composition, and/or a further substrate can be provided having HEA nanoparticles with a different mixture composition, for example to allow for tuning of catalytic characteristics along a direction of reactant flow (e.g., as described with respect to FIG. 1D above).

The method 210 can proceed to process block 214, where the reactants are contacted with the HEA nanoparticles. For example, the contact can be achieved by flowing the reactant gases across the substrate supporting the HEA nanoparticles thereon, e.g., parallel to a main surface (i.e., in a direction perpendicular to thickness) of the substrate. Alternatively or additionally, the contact can be achieved by flowing the reactant gases through the substrate supporting the HEA nanoparticles thereon, e.g., perpendicular to the main surface of the substrate, when the substrate is porous.

The method 210 can proceed to process block 216, where the reactants contacting the HEA nanoparticles are further subjected to heating, thereby driving the thermochemical reaction that converts the reactants into products. In some embodiments, the heating of process block 216 may be substantially continuous (or at least substantially continuous over several hours). Alternatively, the heating of process block 216 may be periodic, with a ramp-up period (heating), a dwell period (maintain), and a ramp-down period (cooling). The heating can be provided by the substrate supporting the HEA nanoparticles thereon, e.g., by passing a current through the substrate to produce Joule heating. Alternatively or additionally, the heating can be provided by a separate heating element in thermal communication (e.g., conductive, convective, or radiative heat transfer) with the HEA nanoparticles.

In some embodiments, the heating may be such that the reactants and/or HEA nanoparticles are subjected to (or maintained at) a peak temperature of 300-600° C., such as ~500° C. For example, the reactants can be ammonia and the products can be hydrogen and nitrogen for a thermochemical reaction involving ammonia decomposition, or vice versa for a thermochemical reaction involving ammonia synthesis. In some embodiments involving ammonia decomposition, the heating of 216 can be effective to convert at least 80% of ammonia reactants to hydrogen and nitrogen products (e.g., at a temperature of ~500° C.).

Although some of blocks 212-216 of method 210 have been described as being performed once, in some embodiments, multiple repetitions of a particular process block may be employed before proceeding to the next decision block or process block. In addition, although blocks 212-216 of method 210 have been separately illustrated and described, in some embodiments, process blocks may be combined and performed together (simultaneously or sequentially). Moreover, although FIG. 2B illustrates a particular order for blocks 212-216, embodiments of the disclosed subject matter are not limited thereto. Indeed, in certain embodiments, the blocks may occur in a different order than illustrated or simultaneously with other blocks. For example, the reactant flow of process block 214 and heating of process block 216 may occur simultaneously in a continuously operating thermochemical reaction setup. Accordingly, embodiments of the disclosed subject matter are not limited to the specific order illustrated in FIG. 2B and described above.

In some embodiments, a system can be provided for performing a thermochemical reaction according to the method 210 of FIG. 2B. In some embodiments, the system can include a process chamber or reactor (e.g., a gas reactor with a membrane to separate products from unreacted reactants) containing or integrated with the catalytic structure (e.g., with the substrate supported within the gas reactor or formed on an internal sidewall of the gas reactor). For example, the system may further include a current source with electrical connections to the substrate to effect the substantially continuous or periodic heating for the thermochemical reaction. In some embodiments, the system can include a controller or control module configured to control the various components of the system to perform the method 210.

Figure 2C:
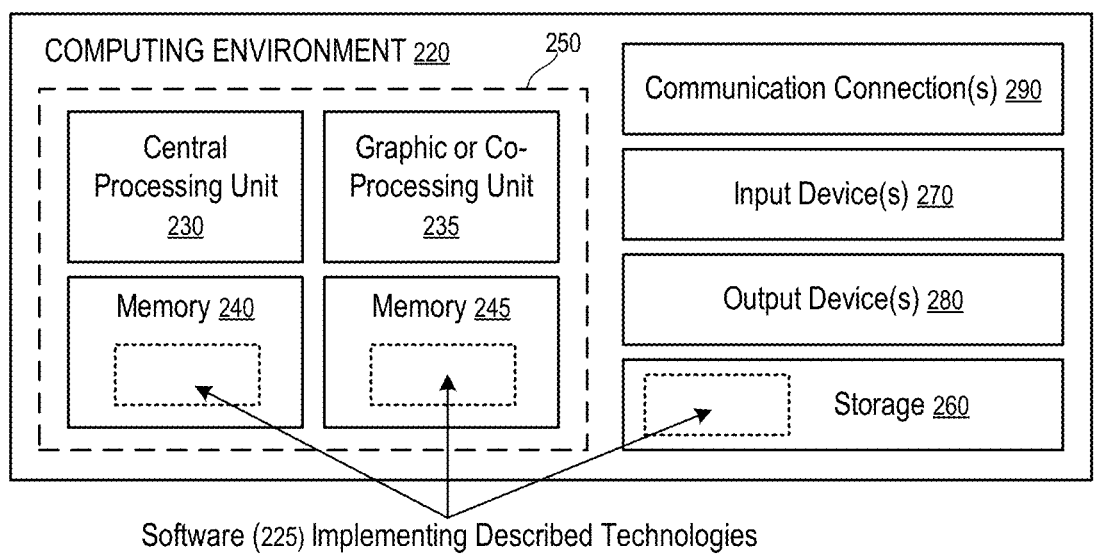
FIG. 2C is a simplified schematic diagram depicting a generalized example of a computing environment in which the disclosed technologies may be implemented.
Figure 3:
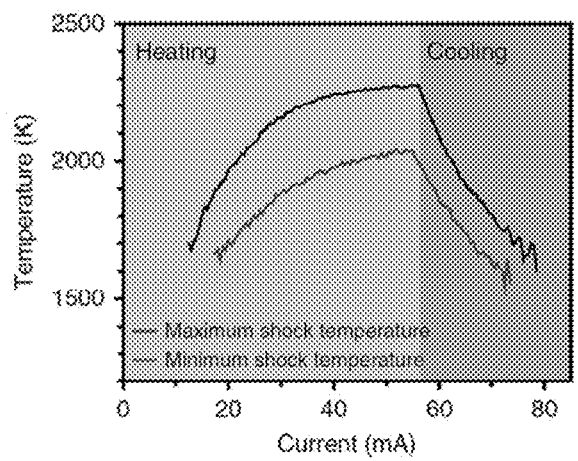
FIG. 3 is a graph of thermal shock temperature profiles, as determined by the intensity of emitted light at different wavelengths, during performed experiments.

FIG. 2C depicts a generalized example of a suitable computing environment 220 in which the described innovations may be implemented, such as control aspects of fabrication of a catalyst or catalytic structure, and/or control aspects of a thermochemical reaction employing a catalyst or catalytic structure. The computing environment 220 is not intended to suggest any limitation as to scope of use or functionality, as the innovations may be implemented in diverse general-purpose or special-purpose computing systems. For example, the computing environment 220 can be any of a variety of computing devices (e.g., desktop computer, laptop computer, server computer, tablet computer, etc.). In some embodiments, the computing environment is an integral part of an optical imaging system. Alternatively, in some embodiments, the computing environment is a separate system connected to the optical imaging system, for example, by making operative electrical connections (e.g., wired or wireless) to the optical imaging system or components thereof.

With reference to FIG. 2C, the computing environment 220 includes one or more processing units 230, 235 and memory 240, 245. In FIG. 2C, this basic configuration 250 is included within a dashed line. The processing units 230, 22C35 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 2C shows a central processing unit 230 as well as a graphics processing unit or co-processing unit 235. The tangible memory 240, 245 may be volatile memory (e.g., registers, cache, RAM), non-volatile memory (e.g., ROM, EEPROM, flash memory, etc.), or some combination of the two, accessible by the processing unit(s). The memory 240, 245 stores software 225 implementing one or more innovations described herein, in the form of computer-executable instructions suitable for execution by the processing unit(s).

A computing system may have additional features. For example, the computing environment 220 includes storage 260, one or more input devices 270, one or more output devices 280, and one or more communication connections 290. An interconnection mechanism (not shown) such as a bus, controller, or network interconnects the components of the computing environment 220. Typically, operating system software (not shown) provides an operating environment for other software executing in the computing environment 220, and coordinates activities of the components of the computing environment 220.

The tangible storage 260 may be removable or non-removable, and includes magnetic disks, magnetic tapes or cassettes, CD-ROMs, DVDs, or any other medium which can be used to store information in a non-transitory way, and which can be accessed within the computing environment 220. The storage 260 can store instructions for the software 225 implementing one or more innovations described herein.

The input device(s) 270 may be a touch input device such as a keyboard, mouse, pen, or trackball, a voice input device, a scanning device, or another device that provides input to the computing environment 220. The output device(s) 270 may be a display, printer, speaker, CD-writer, or another device that provides output from computing environment 220.

The communication connection(s) 290 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Fabricated Examples and Experimental Results

To fabricate a carbon-nanofiber (CNF) film as a substrate for catalyst formation, 8 wt % polyacrylonitrile (PAN) in dimethylformamide (DMF) was used to make a polymer nanofiber network via electrospinning (e.g., voltage: 15 kV, distance: 10 cm, feed rate: 0.065 ml/min, collected on a rotating drum at 40 rpm). The derived nanofibers were stabilized in air at 533 K for 6 hours, and then carbonized at 1173 K for 2 hours in argon using a tube furnace to form the CNF film. The CNF film can be further thermally activated at 1023 K for 2 hours in carbon dioxide ($CO_2$) atmosphere to create surface defects for effective particle dispersion. To fabricate the HEA nanoparticles, individual metal salts (e.g., chloride salts, such as $FeCl_3$, $CoCl_2$, $NiCl_2$, $CuCl_2$, and $MoCl_3$) were dissolved in ethanol in a designed ratio of $Co_xMo_yFe_aNi_bCu_c$ (x+y=a+b+c, and a=b=c=10). In particular, the atomic ratio of Co/Mo was controlled to be 15/55, 25/45, 35/35, 45/25, and 55/15). The CNF films were suspended over the trench of two glass slides (with a 2 cm gap) and then connected to two copper electrodes by silver paste for subsequent precursor solution loading. The salt precursor solution was dipped onto the CNF film with a precursor loading of 5 µmol/cm². The samples were left to dry at room temperature.

The CoMoFeNiCu HEA nanoparticles were synthesized by employing flash heating and cooling (e.g., a thermal shock process) of the previously-deposited metal precursors on the CNF film (e.g., oxygenated carbon supports). The thermal shock process was performed through Joule heating of the precursor-loaded CNF films in an argon-filled glovebox. A precision-control current meter (Keithley SourceMeter 2425) was used as the electrical power source, and the thermal shock was provided by control of the applied current pulse magnitude (e.g., corresponding to temperature), pulse duration (e.g., thermal shock time), and cooling speed (e.g., ramp rate). To measure the emitted light intensity from the substrate, and thereby estimate the temperature during the thermal shock process, a time-resolved pyrometer was used. The emitted light was dispersed at a resolution of 6.5 nm/mm, and collected by a 32-channel photomultiplier tube array. The full spectrum can be integrated from the 32-channels and then fitted to the blackbody radiation equation to estimate the temperature of the substrate during nanoparticle fabrication.

In the fabricated examples, a 55-ms electrical pulse was used, temperatures were 2000-2300 K (as measured by the pyrometer), and temperature ramping rate was on the order of $10^5$ K/s. Five types of HEA nanoparticles with the general composition $Co_xMo_yFe_aNi_bCu_c$ (x+y=70, and a=b=c=10) were prepared, in which the atomic ratio of Co/Mo was controlled to be 15/55, 25/45, 35/35, 45/25, and 55/15 by varying the loading of precursors. Bimetallic Co—Mo and monometallic Ru nanoparticles were also synthesized using the same method with similar metal loadings, which served as control.

Figure 4A:
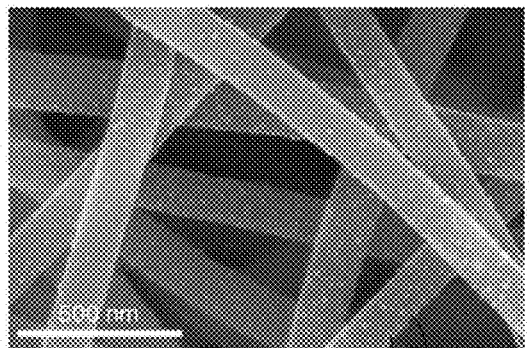
FIG. 4A is a scanning electron microscopy (SEM) image of fabricated Co—Mo HEA nanoparticles ($Co_{25}Mo_{45}Fe_{10}Ni_{10}Cu_{10}$) on carbon nanofibers (CNFs).
Figure 4B:
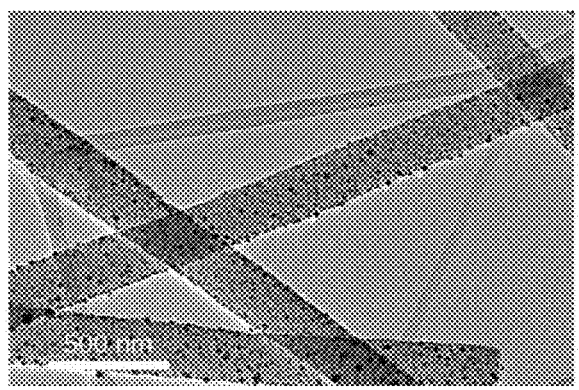
FIGS. 4B-4C are transmission electron microscopy (TEM) images of fabricated Co—Mo HEA nanoparticles ($Co_{25}Mo_{45}Fe_{10}Ni_{10}Cu_{10}$) on carbon nanofibers (CNFs) and on a single carbon nanofiber, respectively.
Figure 4C:
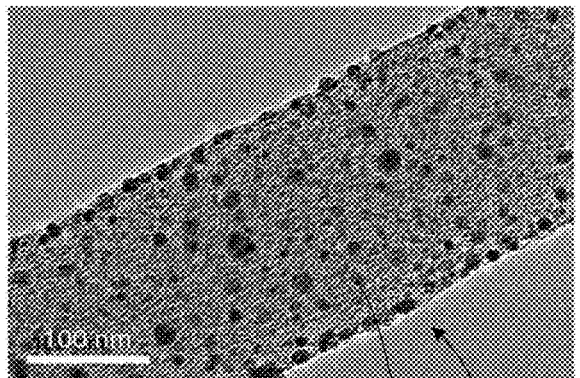
Figure 4D:
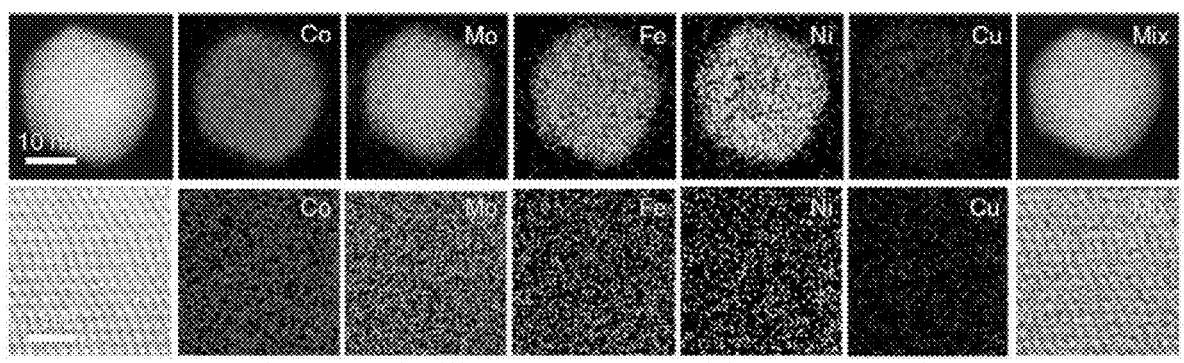
FIG. 4D shows scanning TEM (STEM) based elemental maps of fabricated Co—Mo HEA nanoparticles ($Co_{25}Mo_{45}Fe_{10}Ni_{10}Cu_{10}$) at low-resolution (upper panel) and high-resolution.
Figure 4E:
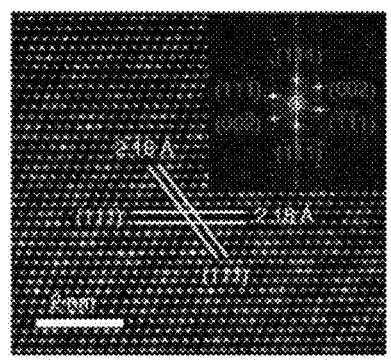
FIG. 4E shows a high-resolution high-angle annular dark-field scanning TEM (HAADF-STEM) image of fabricated Co—Mo HEA nanoparticles ($Co_{25}Mo_{45}Fe_{10}Ni_{10}Cu_{10}$), with fast Fourier transform (FFT) pattern indicating a face-centered cubic (FCC) structure.

FIG. 4A shows representative scanning electron microscopy (SEM) images of the $Co_{25}Mo_{45}Fe_{10}Ni_{10}Cu_{10}$ nanoparticles uniformly dispersed on the carbon nanofibers. The spacing between neighboring nanoparticles varies from ~10 nm to ~100 nm. The average particle size is measured to be ~22 nm from the transmission electron microscopy (TEM) images, as shown in FIGS. 4B-4C. As shown in FIG. 4D, low-magnification and high-magnification elemental maps depict homogeneous distribution of all the five elements throughout the $Co_{25}Mo_{45}Fe_{10}Ni_{10}Cu_{10}$ nanoparticles. Similar observations were also obtained on the HEA nanoparticles of different compositions, as shown in FIGS. 5A-8A and 5B-8B. In contrast, bimetallic $Co_{36}Mo_{64}$ nanoparticles (corresponding to Co/Mo=25/45) show separated Co- and Mo-rich phases, as this composition falls into the miscibility gap in the corresponding binary phase diagram. Atomically resolved high-angle annular dark-field scanning TEM (HAADF-STEM) imaging and the corresponding fast Fourier transform (FFT) analysis reveal a face centered cubic (FCC) phase for the HEA nanoparticles, with the inter-plane spacing measured to be 2.18 Å for the (111) lattice fringes, as shown in FIG. 4E.

Figure 4F:
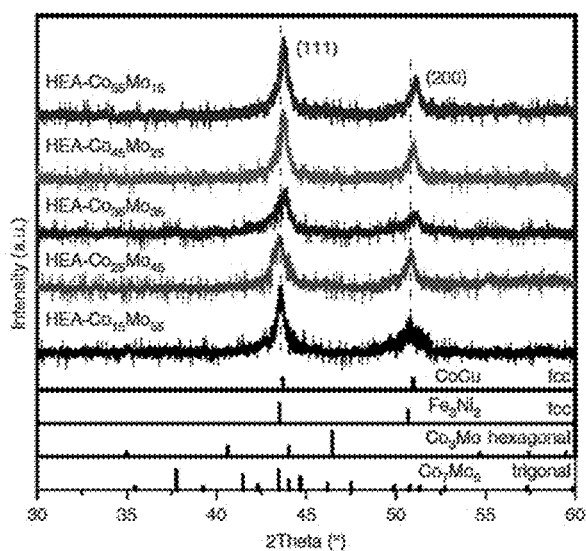
FIG. 4F is a graph of X-ray diffraction (XRD) patterns of fabricated Co—Mo HEA nanoparticles ($Co_{25}Mo_{45}Fe_{10}Ni_{10}Cu_{10}$) supported on CNFs in comparison to various bi-metallic materials.

The crystal structure of the HEA nanoparticles was further confirmed by X-ray diffraction (XRD) analysis. As shown in the XRD patterns of FIG. 4F, the HEA nanoparticles exhibit two peaks at around 440 and 51°, which can be assigned to the (111) and (200) planes of a FCC crystal. A small upshift of the peak position is discernible as the Co/Mo ratio increases, but merely by ~0.5° for the (111) peak from $C_{15}Mo_{55}Fe_{10}Ni_{10}Cu_{10}$ to $C_{55}Mo_{15}Fe_{10}Ni_{10}Cu_{10}$, indicating rather small differences in lattice strain among the HEA nanoparticles of various compositions. In contrast, only two crystal phases are known for bimetallic Co—Mo alloys, i.e., $Co_3Mo$ with a hexagonal structure ($P_{63}$/mmc) and $Co_7Mo_6$ with a trigonal structure (R–3m). As shown in FIG. 4F, the XRD patterns recorded for the $Co_xMo_yFe_{10}Ni_{10}Cu_{10}$ nanoparticles do not match either one of these two phases, but are more in line with those of the bimetallic alloys in FCC phases, albeit with shifted peak positions. This observation is consistent with the features of high-entropy alloys and confirms that the derived nanoparticles are in a single FCC solid-solution phase.

Figure 4G:
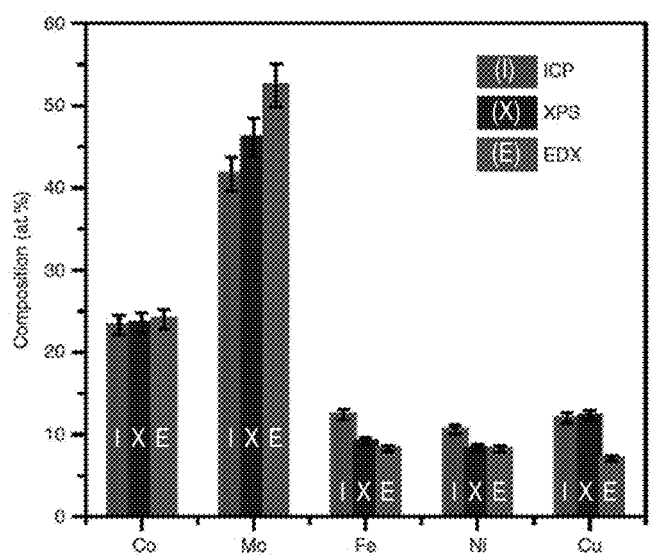
FIG. 4G illustrates the measured composition of fabricated Co—Mo HEA nanoparticles ($Co_{25}Mo_{45}Fe_{10}Ni_{10}Cu_{10}$) measured using inductively coupled plasma-mass spectrometry (ICP-MS), X-ray photoemission spectroscopy (XPS), and energy dispersive X-ray spectroscopy (EDX).

A combination of inductively coupled plasma-mass spectrometer (ICP-MS), X-ray photoemission spectroscopy (XPS), and energy dispersive X-ray spectroscopy (EDX) was employed to analyze the element compositions of the HEA nanoparticles. Among these three techniques, ICP and EDX provide composition information for the bulk of the nanoparticles, and average over the whole catalyst, whereas XPS is more sensitive to the surface region (~1 nm in depth estimated from the beam energy of Al Kα). As shown in FIG. 4G, the three methods generated consistent results for the alloy compositions. This is consistent with the homogeneous alloy nature as revealed by the STEM-based element mapping and excludes the occurrence of surface segregation or phase separation. The XPS analysis also shows that all the constituting elements of the HEA nanoparticles are in metallic states. Compositions for $Co_xMo_yFe_aNi_bCu_c$ examples measured using ICP are shown in Table 1. Metal loading was the overall weight percentages of metals in each catalysts as determined by ICP-MS analyses, and $S_{BET}$ was estimated from the $N_2$ adsorption isotherms according to Brunauer-Emmett-Teller (BET) theory.

TABLE 1

Composition of fabricated $Co_xMo_yFe_{10}Ni_{10}Cu_{10}$ catalysts.

| Sample | Co (%) | Mo (%) | Fe (%) | Ni (%) | Cu (%) | Metal loading (wt %) | $S_{BET}$ (m²/g) |
|---|---|---|---|---|---|---|---|
| $Co_{15}Mo_{55}Fe_{10}Ni_{10}Cu_{10}$ | 14.3 | 51.8 | 12.6 | 11.2 | 10.1 | 8.2 | 150 |
| $Co_{25}Mo_{45}Fe_{10}Ni_{10}Cu_{10}$ | 23.3 | 41.7 | 12.4 | 10.6 | 12.0 | 7.8 | 157 |
| $Co_{35}Mo_{35}Fe_{10}Ni_{10}Cu_{10}$ | 33.5 | 32.3 | 12.0 | 10.8 | 11.4 | 8.3 | 160 |
| $Co_{45}Mo_{25}Fe_{10}Ni_{10}Cu_{10}$ | 42.9 | 23.5 | 11.7 | 11.5 | 10.4 | 8.8 | 148 |
| $Co_{55}Mo_{15}Fe_{10}Ni_{10}Cu_{10}$ | 52.8 | 13.2 | 11.9 | 10.8 | 11.3 | 9.3 | 153 |

Figure 4H:
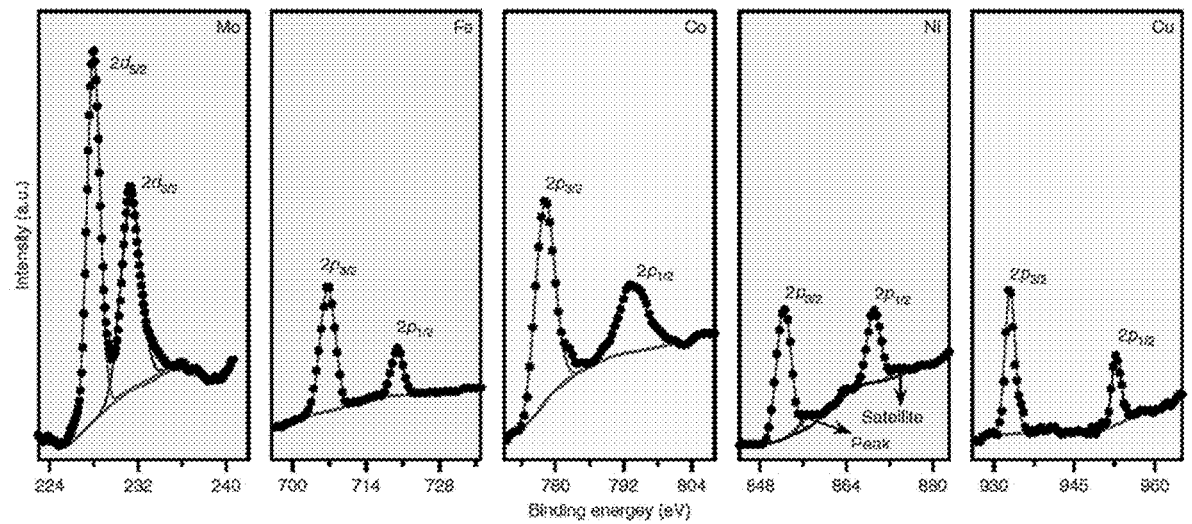
FIG. 4H shows XPS spectra collected at the Mo 3d, Fe 2p, Co 2p, Ni 2p, and Cu 2p edges for fabricated Co—Mo HEA nanoparticles ($Co_{25}Mo_{45}Fe_{10}Ni_{10}Cu_{10}$).
Figure 4I:
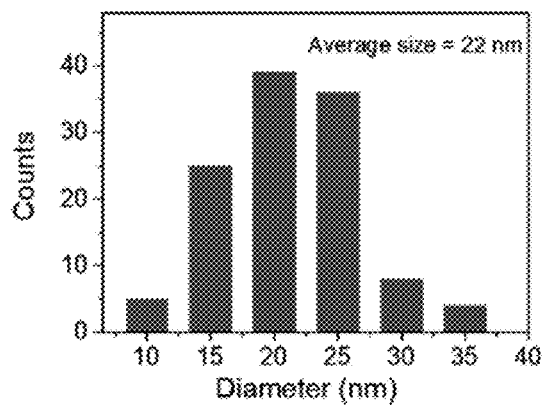
FIG. 4I is a graph of particle size distribution for fabricated Co—Mo HEA nanoparticles ($Co_{25}Mo_{45}Fe_{10}Ni_{10}Cu_{10}$).
Figure 5A:
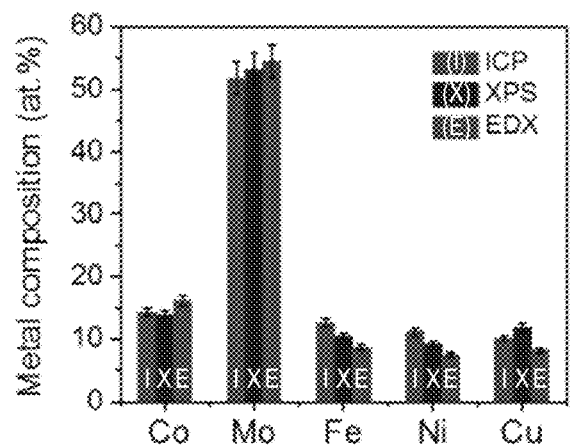
FIGS. 5A, 6A, 7A, and 8A show the measured compositions for fabricated $Co_{15}Mo_{55}Fe_{10}Ni_{10}Cu_{10}$ nanoparticles, $Co_{35}Mo_{35}Fe_{10}Ni_{10}Cu_{10}$ nanoparticles, $Co_{45}Mo_{25}Fe_{10}Ni_{10}Cu_{10}$ nanoparticles, and $Co_{55}Mo_{15}Fe_{10}Ni_{10}Cu_{10}$ nanoparticles, respectively.
Figure 6A:
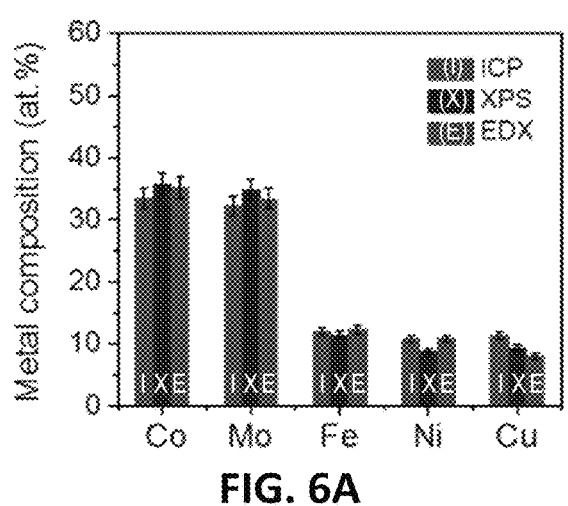
Figure 7A:
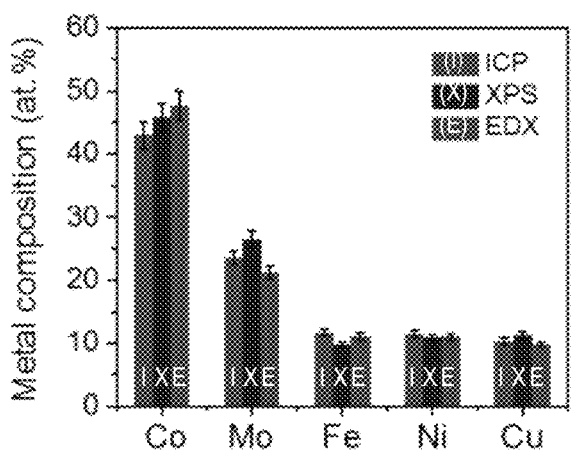
Figure 8A:
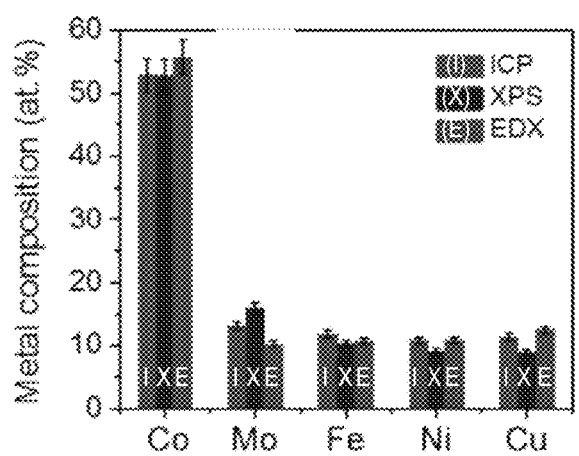
Figure 5B:
FIGS. 5B, 6B, 7B, and 8B show STEM-based elemental maps at low resolution of fabricated $Co_{15}Mo_{55}Fe_{10}Ni_{10}Cu_{10}$ nanoparticles, $Co_{35}Mo_{35}Fe_{10}Ni_{10}Cu_{10}$ nanoparticles, $Co_{45}Mo_{25}Fe_{10}Ni_{10}Cu_{10}$ nanoparticles, and $Co_{55}Mo_{15}Fe_{10}Ni_{10}Cu_{10}$ nanoparticles, respectively.
Figure 6B:
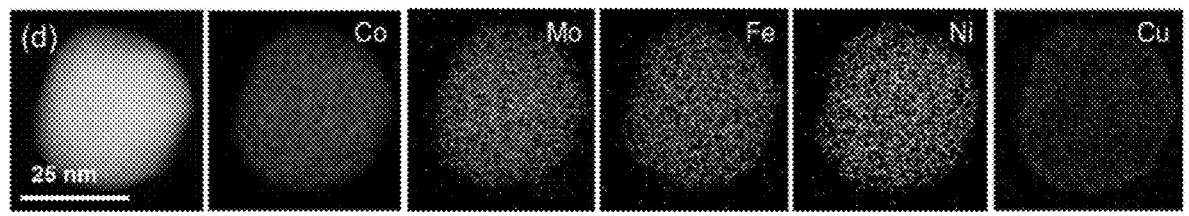
Figure 7B:
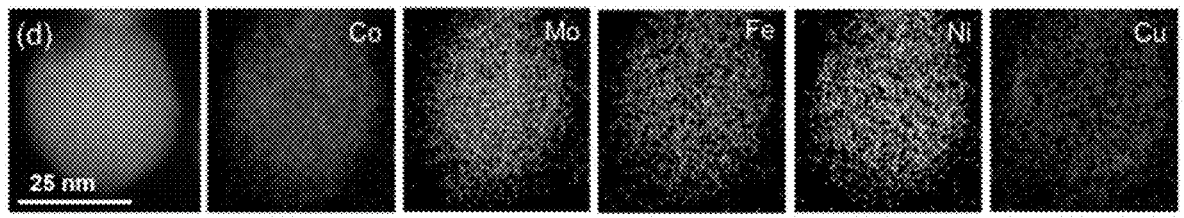
Figure 8B:
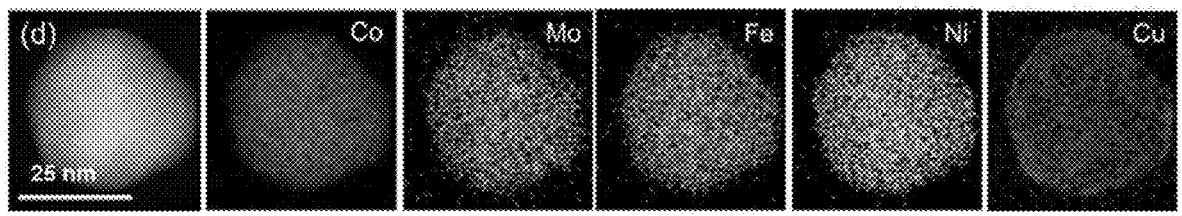

FIG. 4H shows representative XPS spectra recorded at the 3d edge of Mo and 2p edges of Co, Fe, Ni, and Cu. For example, the two peaks associated with the Mo 3d5/2 and 3d3/2 doublet are located at 228.0 and 231.2 eV, respectively, while the Co 2p3/2 and 2p1/2 peaks are at 778.2 and 793.3 eV, respectively. Both of these two sets of binding energies, as well as those for Fe, Ni, and Cu, are in line with the established values for pure metals. Charge transfer between the metals, or ligand effect, thus may not be significant in the $Co_xMo_yFe_aNi_bCu_c$ nanoparticles.

To provide control samples, bimetallic Co—Mo was supported on CNFs (e.g., ratios of Co/Mo=15/55, 25/45, 35/35, 45/25, and 55/15), which were prepared by the same method as the HEA nanoparticles. For example, $CoCl_2$ and $MoCl_3$ were dissolved in ethanol at an atomic ratio (Co/Mo) of 25/45 and total loading of 10 wt %. The salt precursor solution was then dip-coated onto the CNF film with a precursor loading of 5 µmol/cm². The samples were left to dry at room temperature, and then underwent the carbothermal shock process described as above.

Another control sample, Ru/CNF, was prepared by incipient wetness impregnation. In particular, 50 mg carbon nanofibers were dispersed in ethanol, and sonicated for 1 hour. Certain amount of $RuCl_3 \times H_2O$ was dissolved in ethanol, with a nominal Ru loading of 10 wt %. The solutions were mixed together and sonicated for another 30 min, after which the solvent was removed by using a rotary evaporator. The obtained solid was dried in vacuum and then calcined at 700° C. in argon for 2 hours.

To test catalytic activity, the fabricated catalysts were used in ammonia ($NH_3$) decomposition. Catalytic decomposition of $NH_3$ was conducted in a fixed-bed flow reactor at atmospheric pressure. 25 mg of catalyst was loaded into a quartz tube reactor (having an inner diameter of 7 mm). The catalyst was heated to 600° C. at a rate of 5° C./min under a flow of $H_2$ (50 mL/min) for 2 hours, and then purged by a flow of helium (50 mL/min) for 1 hour. After the helium purge, the catalyst was then cooled to 275° C. under a helium atmosphere. Once the temperature of 275° C. was reached, the gas flow was switched to 5 vol % $NH_3$ (balanced by helium) or 100 vol % $NH_3$. The gas hourly space velocity (GHSV) was adjusted to 36 L $gcat^{-1}$ $h^{-1}$ by controlling the flow rate. Reactions were then carried out at various temperatures, which was increased in a stepwise manner from 275° C. to 600° C., and steady state was allowed to reach before the product was analyzed.

To determine the conversions of reactant, an FTIR spectrometer equipped with a long path (5 m) gas cell and a mercury-cadmium-telluride (MCT) infrared (TR) detector (with a resolution of 8 $cm^{-1}$) was used to analyze $NH_3$ (964 $cm^{-1}$, 929 $cm^{-1}$). The $NH_3$ conversion was calculated by the equation:

$$NH_3 \text{conversion} = \frac{[NH_3]_{inlet} - [NH_3]_{outlet}}{(1 + [NH_3]_{outlet}) \times [NH_3]_{inlet}} \times 100\%$$

where $[NH_3]_{inlet}$ and $[NH_3]_{outlet}$ refer to the measured concentrations of $NH_3$ fed into and flowing out of the reactor. $N_2$ and $H_2$ were detected by using a gas chromatography/barrier discharge ionization detector (GC-BID) equipped with column packed with an absorbent porous polymer composed of ethylvinylbenzene and divinylbenzene (e.g., Porapak Q), using helium as the carrier gas. The measurements of reaction rates and kinetics were carried out at reduced catalyst loadings and the GHSV was adjusted to 100 L $gcat^{-1}$ $h^{-1}$, ensuring that the reaction condition was within the kinetic zone (<15% conversion) and mass transfer was not limited. The reaction orders were measured at 425° C. The TOFs (turnover frequencies) were calculated based on the surface metal atoms. The surface metal atoms of bimetallic Co—Mo and $Co_xMo_yFe_aNi_bCu_c$ catalysts were estimated by assuming the nanoparticles as perfect FCC cubooctahedral particles.

From the TEM picture of the nanoparticle, the lattice parameter (a) of the FCC lattice was measured to be 3.776 Å. The number of total atoms (NT) and the number of surface atoms (NS) in a perfect FCC cuboctahedral particle vary, respectively, as a function of:

$$16m^3 - 33m^2 + 24m - 6; \text{ and } 30m^2 - 60m + 32,$$

where m is the number of atoms lying on each equivalent edge of the particle. Thus, the diameter of a sphere with a volume equal to NT atoms can be expressed as:

$$d = \sqrt[3]{\frac{3}{2\pi} N_T} \cdot a.$$

Consequently, it was estimated that a 21.8 nm particle would contain a total of 403,014 atoms (correspondingly, m=30) in which 25,232 atoms are on the surface, leading to a surface/volume ratio of about 6.26%.

Figure 9A:
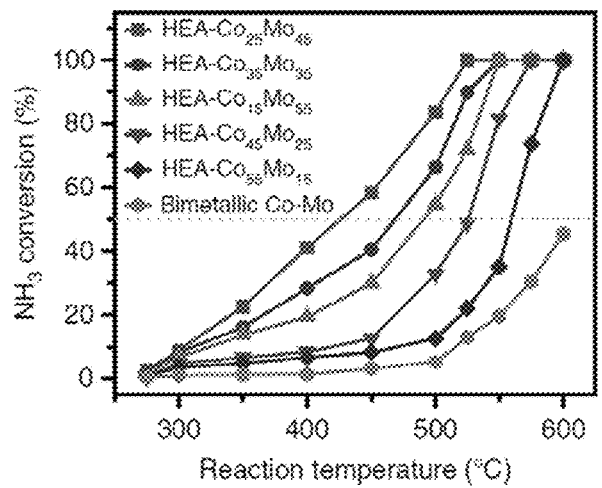
FIGS. 9A-9B are graphs of ammonia conversion versus reaction temperature at a space velocity of 36 L $g_{cata}^{-1}h^{-1}$, for different fabricated $Co_xMo_yFe_{10}Ni_{10}Cu_{10}$ nanoparticles, Ru on CNF, or a bi-metallic Co—Mo (Co/Mo=25/45) as catalyst.

The $Co_xMo_yFe_aNi_bCu_c$ nanoparticles supported on CNFs were directly applied as catalysts for the ammonia decomposition reaction and compared to the bimetallic Co—Mo with the ratio of 25/45 (~20 nm in particle size) and monometallic Ru (~2-3 nm in particle size) catalysts with similar metal loadings and same substrates. The catalytic activity was systematically measured at 250-600° C. using a plug flow reactor and 5 vol % $NH_3$ as the feeding gas. The bare CNF substrate was also measured and confirmed to be inactive for $NH_3$ decomposition. FIG. 9A summarizes the measured $NH_3$ conversion as a function of temperature at a GHSV of 36 L $g_{cat}^{-1}$ $h^{-1}$. For $Co_xMo_yFe_aNi_bCu_c$ catalysts, the reaction had an onset temperature of ~300° C., and the $NH_3$ conversion increases with the reaction temperature. Between 300° C. and 500° C., the $NH_3$ conversion follows the order $Co_{25}Mo_{45}Fe_{10}Ni_{10}Cu_{10} > Co_{35}Mo_{35}Fe_{10}Ni_{10}Cu_{10} > Co_{15}Mo_{55}Fe_{10}Ni_{10}Cu_{10} > Co_{45}Mo_{25}Fe_{10}Ni_{10}Cu_{10} > Co_{55}Mo_{15}Fe_{10}Ni_{10}Cu_{10}$, reaching 50% of conversion ($T_{50}$) at ca. 422, 466, 488, 523, and 558° C., respectively. The reaction reaches saturation (100% conversion) at ~525° C. on $Co_{25}Mo_{45}Fe_{10}Ni_{10}Cu_{10}$, as compared to ~600° C. for $Co_{55}Mo_{15}Fe_{10}Ni_{10}Cu_{10}$.

Figure 9B:
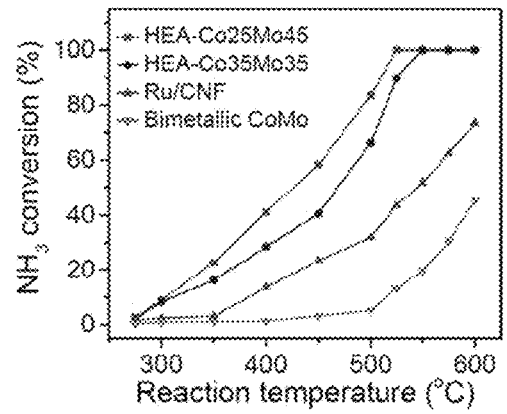
Figure 9C:
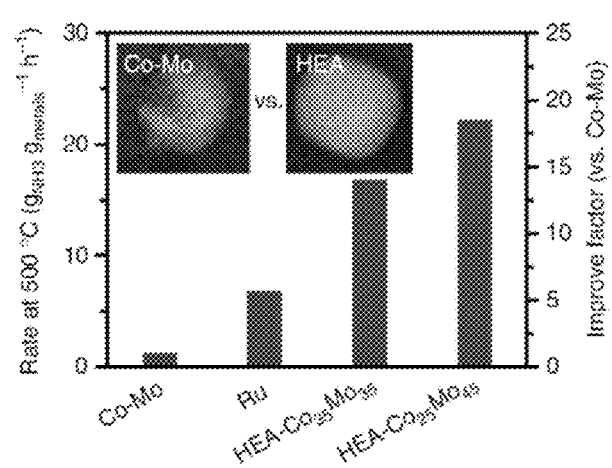
FIG. 9C is a graph of reaction rates measured in the kinetic regime for different fabricated $Co_xMo_yFe_{10}Ni_{10}Cu_{10}$ nanoparticles, Ru on CNF, or a bi-metallic Co—Mo (Co/Mo=25/45) as catalyst.

Most of the HEA nanoparticle catalysts are much more active than the bimetallic Co—Mo and monometallic Ru, with the latter two giving $NH_3$ conversions of only 46% and 73% at 600° C., as shown in FIG. 9B. FIG. 9C compares the reaction rate measured at 500° C. among the two most active HEA catalysts, bimetallic Co—Mo and monometallic Ru. The $Co_{35}Mo_{35}Fe_{10}Ni_{10}Cu_{10}$ and $Co_{25}Mo_{45}Fe_{10}Ni_{10}Cu_{10}$ catalysts reach a mass-specific rate of 16.7 and 22.1 $g_{NH3}$ $g_{metals}^{-1}$ $h^{-1}$ at 500° C., representing improvement factors of ~14 and ~19 versus Co—Mo, respectively.

Figure 10A:
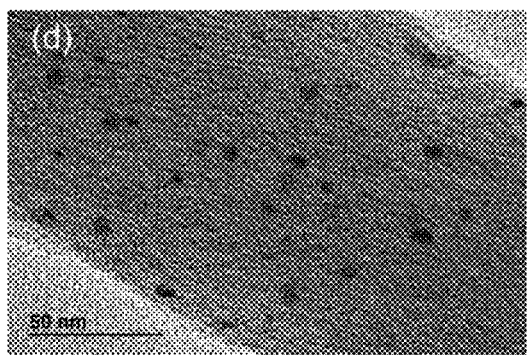
FIG. 10A is a TEM images of fabricated small-size Co—Mo HEA nanoparticles ($Co_{25}Mo_{45}Fe_{10}Ni_{10}Cu_{10}$) on a single carbon nanofiber.
Figure 10C:
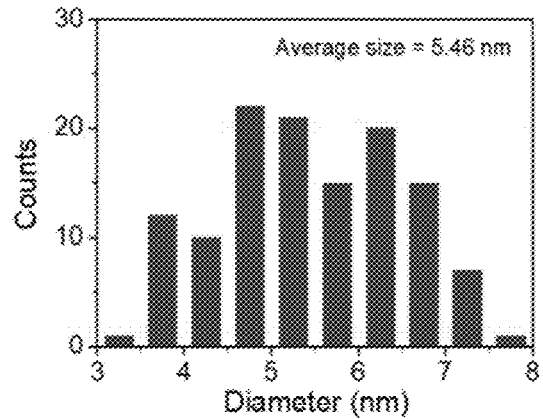
FIG. 10C is a graph of particle size distribution for fabricated small-size Co—Mo HEA nanoparticles ($Co_{25}Mo_{45}Fe_{10}Ni_{10}Cu_{10}$).
Figure 10B:
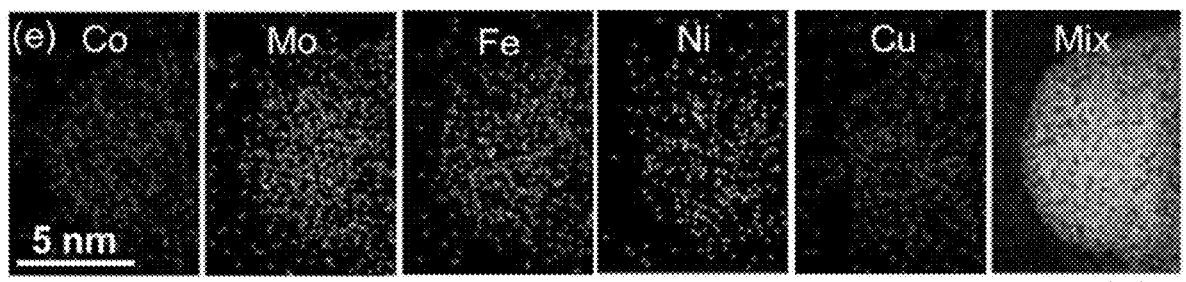
FIG. 10B shows STEM-based low-resolution elemental maps of fabricated small-size Co—Mo HEA nanoparticles ($Co_{25}Mo_{45}Fe_{10}Ni_{10}Cu_{10}$).
Figure 10D:
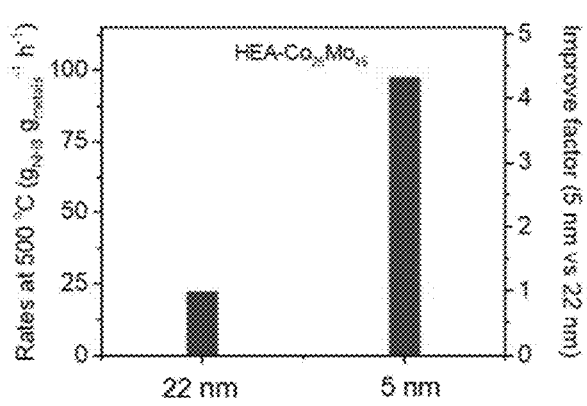
FIG. 10D is a graph of reaction rates measured in the kinetic regime for fabricated $Co_{25}Mo_{45}Fe_{10}Ni_{10}Cu_{10}$ nanoparticles having different average particle size.
Figure 10E:
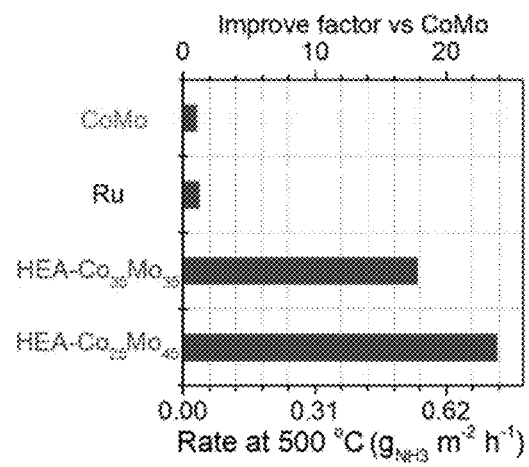
FIG. 10E is graph of measured reaction rates normalized by specific surface areas (estimated from average particle sizes) for different fabricated $Co_xMo_yFe_{10}Ni_{10}Cu_{10}$ nanoparticles, Ru on CNF, or a bi-metallic Co—Mo (Co/Mo=25/45) as catalyst.

Moreover, higher mass-specific activities were obtained with the HEA catalysts of reduced particle sizes, as shown by FIGS. 10A-10D. Compared to the precious metal Ru, the $Co_{25}Mo_{45}Fe_{10}Ni_{10}Cu_{10}$ catalyst achieves an improvement factor of ~3 versus Ru. To take the different particle sizes into account, $Co_{25}Mo_{45}Fe_{10}Ni_{10}Cu_{10}$ achieved an area-specific reaction rate of 0.74 $g_{NH3}$ $m^{-2}$ $h^{-1}$, representing improvement factors of ~24 versus bimetallic Co—Mo and ~19 versus Ru, as shown by FIG. 10E. Further details regarding the performance of HEA catalysts for $NH_3$ decomposition is shown in Table 2 below.

TABLE 2

Comparison of catalytic performance for ammonia
decomposition of $Co_xMo_yFe_{10}Ni_{10}Cu_{10}$ catalysts

| Sample | Metals (wt %) | $NH_3$ (vol %) | T (° C.) | GHSV (mL $g_{cat}^{-1}$ $h^{-1}$) | Conversion (%) | TOF ($h^{-1}$) |
|---|---|---|---|---|---|---|
| $Co_{25}Mo_{45}Fe_{10}Ni_{10}Cu_{10}$ | 7.8 | 5 | 500 | 36,000 | 84 | 1571 |
| $Co_{35}Mo_{35}Fe_{10}Ni_{10}Cu_{10}$ | 8.3 | 5 | 500 | 36,000 | 67 | 1128 |
| $Co_{45}Mo_{25}Fe_{10}Ni_{10}Cu_{10}$ | 8.8 | 100 | 500 | 36,000 | 64.5 | 19,633 |
| $Co_{55}Mo_{15}Fe_{10}Ni_{10}Cu_{10}$ | 9.3 | 100 | 500 | 36,000 | 100 | 25,209 |

Figure 9D:
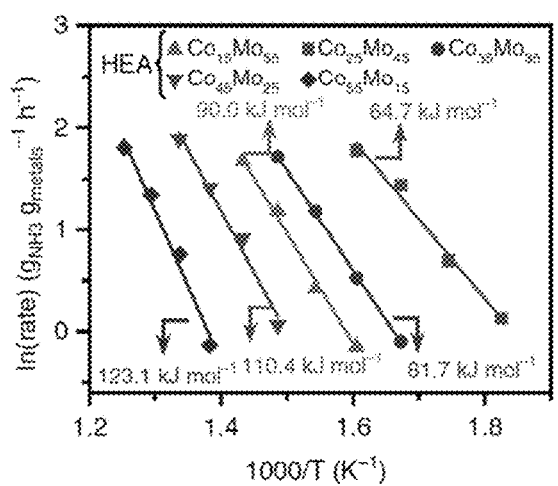
FIG. 9D is an Arrhenius plot for ammonia decomposition using different fabricated $Co_xMo_yFe_{10}Ni_{10}Cu_{10}$ nanoparticles as catalyst.
Figure 9E:
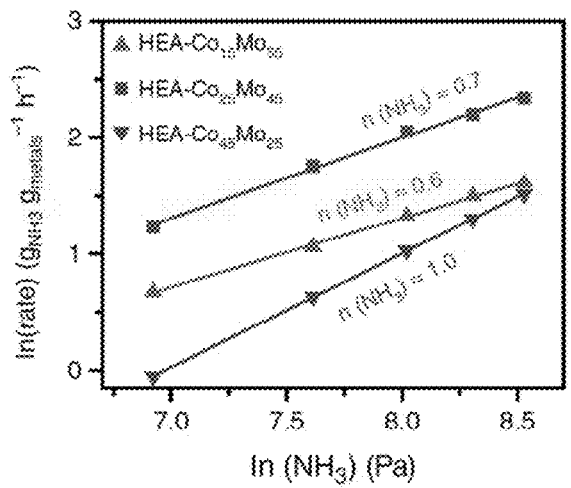
FIGS. 9E-9F show reaction orders of ammonia and hydrogen, respectively, determined for ammonia decomposition using different fabricated $Co_xMo_yFe_{10}Ni_{10}Cu_{10}$ nanoparticles as catalyst.
Figure 9F:
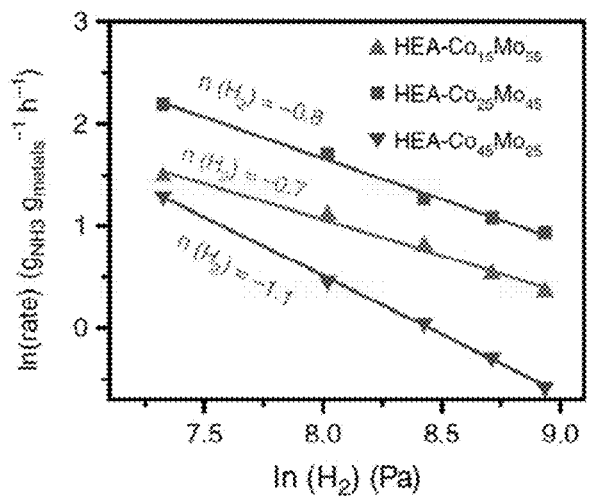

Kinetic studies were also performed on the $Co_xMo_yFe_{10}Ni_{10}Cu_{10}$ catalysts with varying reaction temperature and gas composition. FIG. 9D shows the Arrhenius plots of the reaction rate depending on temperature. The determined apparent activation energy ($E_{app}$) varies with the Co/Mo ratio, with the trend being consistent with that for the $NH_3$ conversion, namely from the lowest 64.7 kJ/mol for the most active $Co_{25}Mo_{45}Fe_{10}Ni_{10}Cu_{10}$ catalyst to 123.1 kJ/mol for the least active $Co_{55}Mo_{15}Fe_{10}Ni_{10}Cu_{10}$ catalyst. The activation energy measured here for $Co_{25}Mo_{45}Fe_{10}Ni_{10}Cu_{10}$ catalyst is comparable to those reported for Ru-based catalysts (e.g., 57.8 to 83.7 kJ/mol). As shown in FIG. 9E, the determined reaction order of $NH_3$ at 425° C. increases with the Co/Mo ratio, varying from 0.6 for $Co_{15}Mo_{55}Fe_{10}Ni_{10}Cu_{10}$ to 1.0 for $Co_{45}Mo_{25}Fe_{10}Ni_{10}Cu_{10}$. This indicates that the activation of $NH_3$ is more difficult on the Co-rich catalysts. On the contrary, the $H_2$ order (at 425° C.) decreases from −0.7 for $Co_{15}Mo_{55}Fe_{10}Ni_{10}Cu_{10}$ to −1.1 for $Co_{45}Mo_{25}Fe_{10}Ni_{10}Cu_{10}$, suggesting a less inhibition effect of $H_2$ on the Mo-rich catalysts, as shown in FIG. 9F. The partial pressure of $N_2$ was found to have little effect on the reaction rate.

Figure 9G:
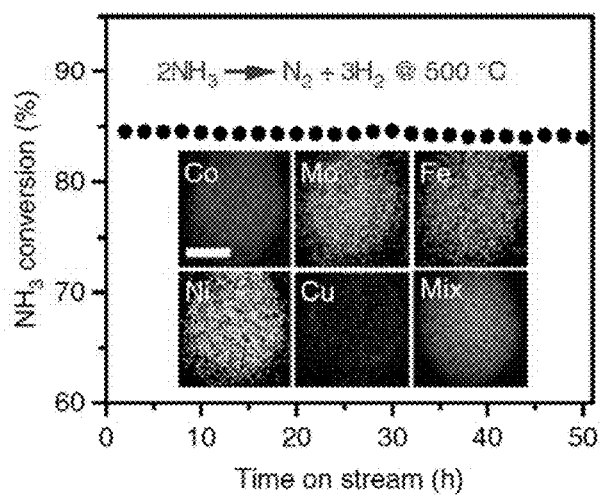
FIG. 9G is a graph of ammonia conversion versus time using a fabricated $Co_{25}Mo_{45}Fe_{10}Ni_{10}Cu_{10}$ nanoparticle as catalyst.
Figure 9H:
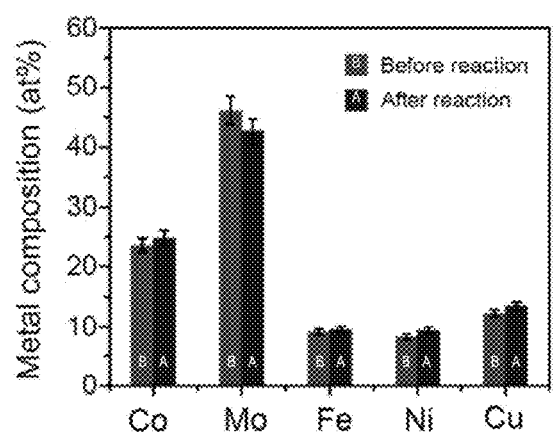
FIG. 9H illustrates the measured composition of fabricated $Co_{25}Mo_{45}Fe_{10}Ni_{10}Cu_{10}$ nanoparticles before and after ammonia decomposition, as measured by XPS.

In addition to the enhanced catalytic activities, the $Co_xMo_yFe_{10}Ni_{10}Cu_{10}$ catalysts were further demonstrated to be highly stable under the reaction conditions for $NH_3$ decomposition. FIG. 9G presents the $NH_3$ conversion recorded on $Co_{25}Mo_{45}Fe_{10}Ni_{10}Cu_{10}$ over the course of continuous operation at 500° C. The degradation in catalytic activity was negligible after ~50 hours. The catalyst collected after this prolonged durability test was characterized by element mapping (see the inset in FIG. 9G) and XPS (FIG. 9H), with nearly no change found in alloy homogeneity or surface composition. A small amount (~1.4 at. %) of N was detected on the used catalyst, but much less than what would be expected for the formation of nitrides throughout the nanoparticles (e.g., ≥10% for $Mo_3Co_3N$). It is likely that the bulk of the HEA nanoparticles were not subjected to nitridation during the $NH_3$ decomposition reaction. The durable performance of the HEA catalysts is in line with the reported high thermal and chemical stabilities of HEAs.

In $NH_3$ decomposition, the recombinative desorption of nitrogen is the rate-determining step on Fe, Co, and Ni, while the kinetics is believed to be limited by scission of the first N—H bond on Rh, Ir, Pd, Pt, and Cu catalysts. Without being bound by any particular theory, the binding strength of nitrogen is believed to a good descriptor for $NH_3$ decomposition catalysts, which largely determines both the stability of adsorbing intermediates (e.g., *N and *NHx) and activation energy of the rate-determining step. In order to interpret the observed kinetic performance, temperature programmed desorption (TPD) of pre-adsorbed atomic nitrogen (2*N→N2) was performed to evaluate the adsorption properties of the $Co_xMo_yFe_{10}Ni_{10}Cu_{10}$ catalysts.

Figure 11A:
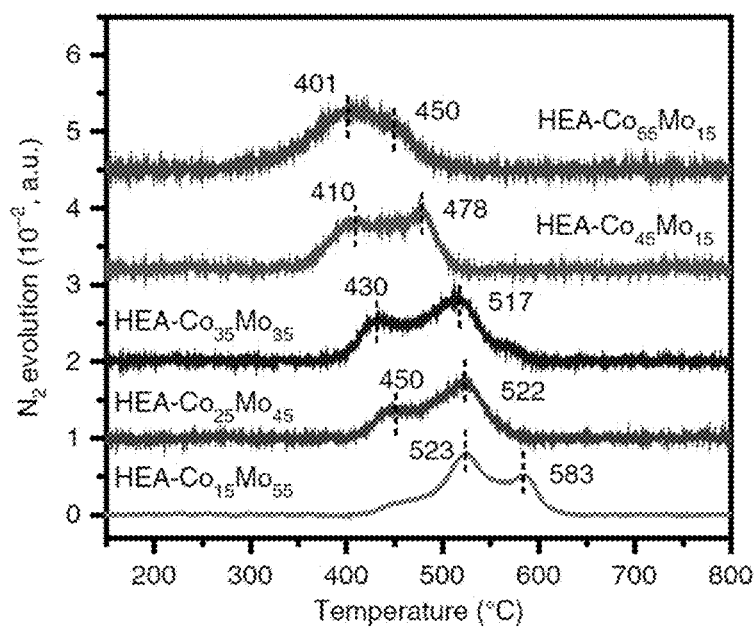
FIG. 11A is a graph of nitrogen temperature programmed desorption (TPD) profiles measured with a temperature ramping rate of 10° C. per minute for different fabricated $Co_xMo_yFe_{10}Ni_{10}Cu_{10}$ nanoparticles.

FIG. 11A shows the nitrogen TPD patterns recorded at a ramping rate of 10° C./min. Two distinct desorption peaks were consistently observed on all the $Co_xMo_yFe_{10}Ni_{10}Cu_{10}$ catalysts in the temperature range of 400-600° C. These features can be assigned to the recombinative desorption of nitrogen on ordered facets (such as (111) and (100) for the first peak) and undercoordinated sites (steps, edges, defects, etc. for the second peak), with the latter having stronger binding to nitrogen and thereby higher desorption temperatures due to the lower coordination numbers. A clear trend is established for the $Co_xMo_yFe_{10}Ni_{10}Cu_{10}$ catalysts of different compositions, with the desorption temperatures (both onset and peak positions) rising at decreasing Co/Mo ratios, suggesting the continuous tuning of nitrogen binding strength by varying the HEA composition.

Figure 11B:
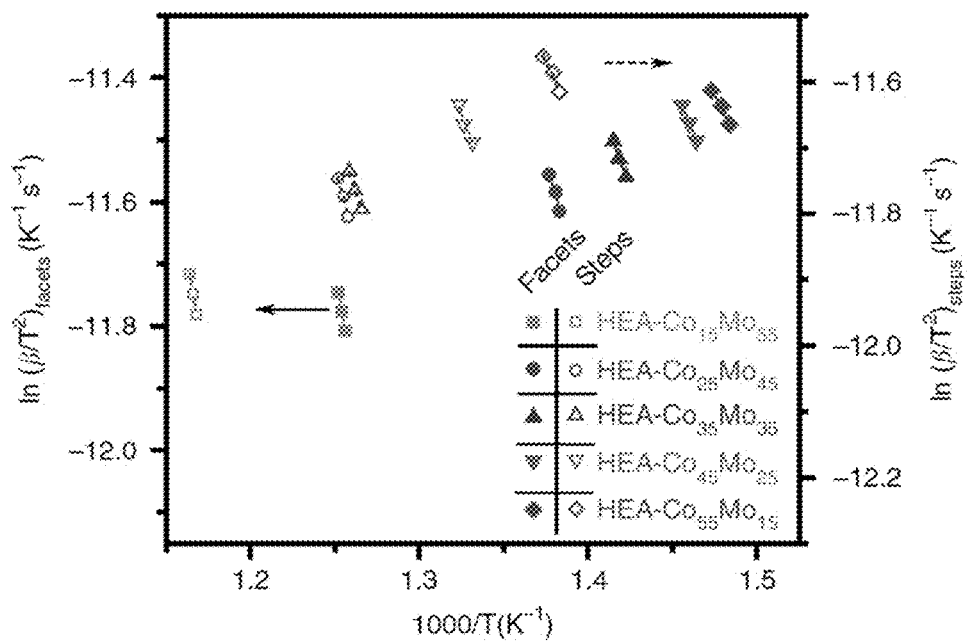
FIG. 11B is a plot of $\ln(\beta/T^2)-1/T$ for the nitrogen TPD profiles measured for different fabricated $Co_xMo_yFe_{10}Ni_{10}Cu_{10}$ nanoparticles, with $\beta$=10, 20, and 30° C. per minute, representing the ramping rates used for the TPD measurements.
Figure 11C:
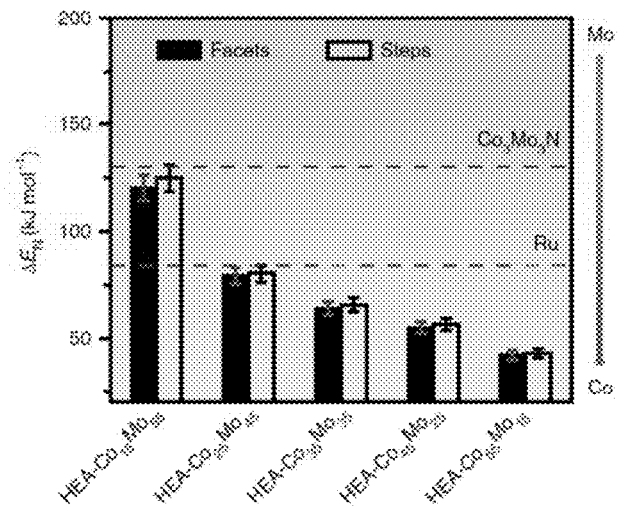
FIG. 11C is a graph of nitrogen adsorption energies ($AE_N$) for different fabricated $Co_xMo_yFe_{10}Ni_{10}Cu_{10}$ nanoparticles, estimated using the plots of FIG. 11B.

According to the TPD theorem, additional measurements were conducted at different ramping rates (3=20 and 30° C./min) to establish plots of $\ln(\beta/T_m^2)$ versus $1/T_m$ (where $T_m$ is the peak position), as shown in FIG. 11B, in which the slopes can be used to estimate the recombinative desorption energy of nitrogen (AEN). FIG. 11C summarizes the derived values of AEN for the different $Co_xMo_yFe_{10}Ni_{10}Cu_{10}$ catalysts. The catalysts with higher Co/Mo ratios have lower AEN, ranging from ~121-125 kJ/mol for $Co_{15}Mo_{55}Fe_{10}Ni_{10}Cu_{10}$ to ~42-44 kJ/mol for $Co_{55}Mo_{15}Fe_{10}Ni_{10}Cu_{10}$. The most active $Co_{25}Mo_{45}Fe_{10}Ni_{10}Cu_{10}$ catalyst has a AEN value of ~79 kJ/mol, which is very close to the AEN (84 kJ/mol) of Ru, thus explaining the high and comparable catalytic activities of the $Co_xMo_yFe_{10}Ni_{10}Cu_{10}$ catalysts to Ru-based catalysts. $Co_{35}Mo_{35}Fe_{10}Ni_{10}Cu_{10}$ catalyst has the same Co/Mo ratio as $Co_3Mo_3N$ but binds to nitrogen much less strongly, as shown in FIG. 11C. This difference (~65 kJ/mol) can be ascribed to the presence of other weakly binding metals (e.g., Fe, Ni, and Cu) in and on the surface of the HEA catalysts.

Figure 11D:
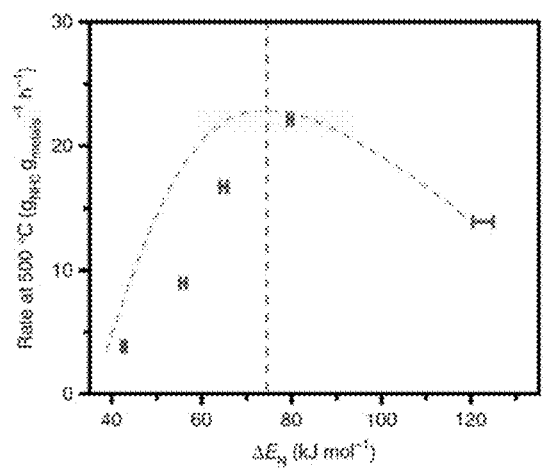
FIG. 11D is a graph illustrating correlations between nitrogen adsorption energies of FIG. 11C and catalytic activities of the different fabricated $Co_xMo_yFe_{10}Ni_{10}Cu_{10}$ nanoparticles.
Figure 11E:
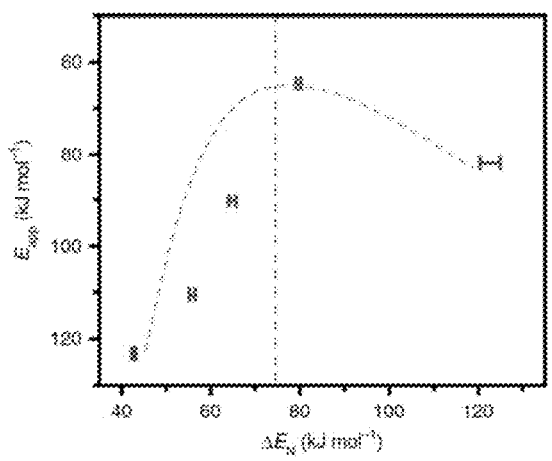
FIG. 11E is a graph illustrating correlations between nitrogen adsorption energies of FIG. 11C and apparent activation energy ($E_{app}$) of the different fabricated $Co_xMo_yFe_{10}Ni_{10}Cu_{10}$ nanoparticles.
Figure 12:
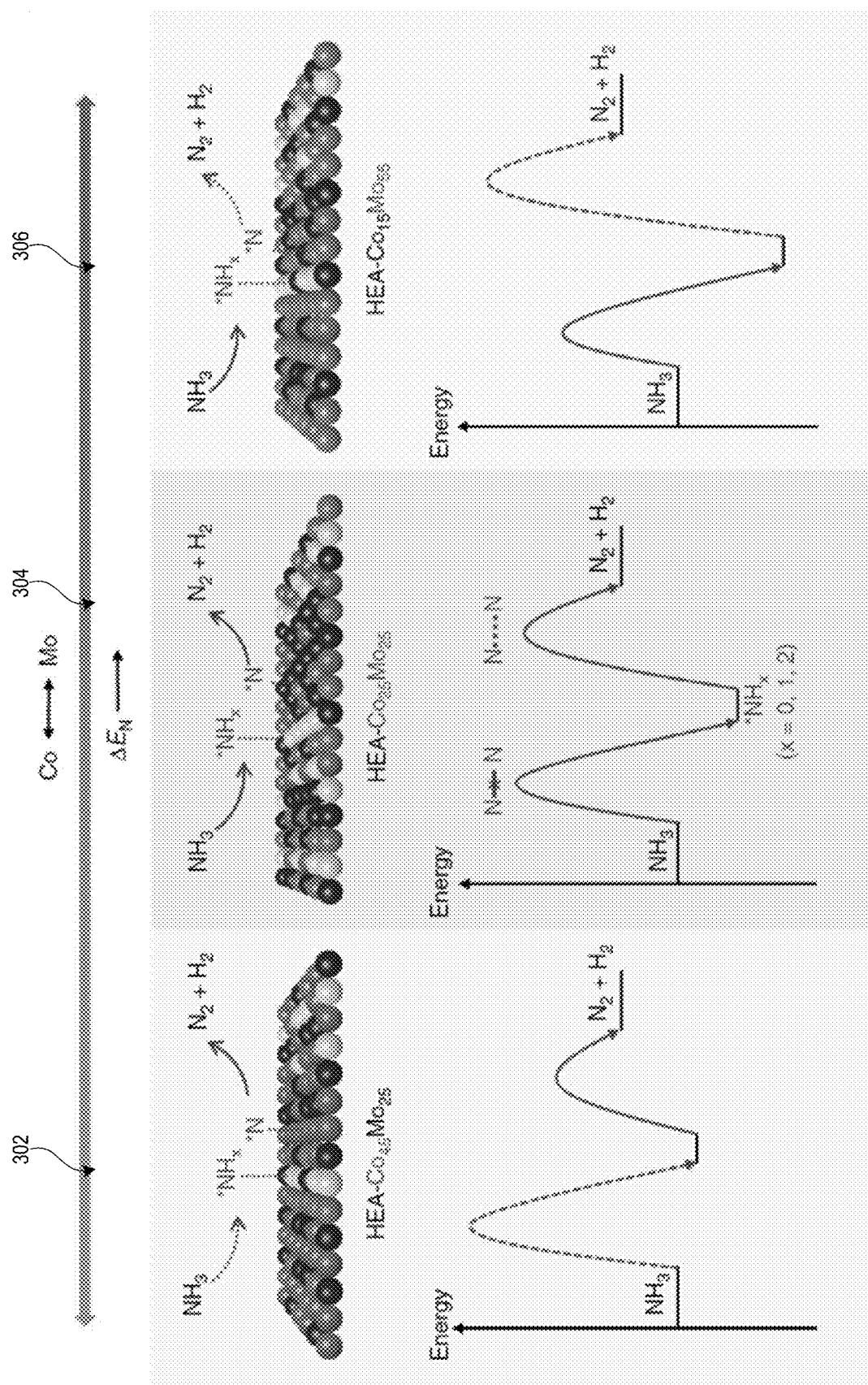
FIG. 12 is a schematic illustration of the rate-limiting factors in ammonia decomposition using different $Co_xMo_yFe_{10}Ni_{10}Cu_{10}$ nanoparticles.

With the estimated nitrogen adsorption energies, a correlation was developed between composition and catalytic performance of the $Co_xMo_yFe_{10}Ni_{10}Cu_{10}$ catalysts. FIGS. 11D-11E show measured $NH_3$ decomposition rates (at 500° C.) and activation energies versus AEN. Both plots exhibit a volcano-type behavior with $Co_{25}Mo_{45}Fe_{10}Ni_{10}Cu_{10}$ being close to the peak position. According to the Sabatier principle, it can be inferred that, on the left side of this peak (e.g., panel 302 of FIG. 12), the catalysts (more Co-rich) bind to N too weakly and thus give rise to rather higher kinetic barriers for dehydrogenation (NH3→*NH2→*NH→*N). Conversely, on the right side (e.g., panel 306 in FIG. 12), the catalysts (more Mo-rich) bind to N too strongly for N to recombine and desorb from the surface (2*N→N2), and a tradeoff between these two factors gives rise to an optimal, intermediate binding energy for the reaction (e.g., panel 304 in FIG. 12).

Figure 11F:
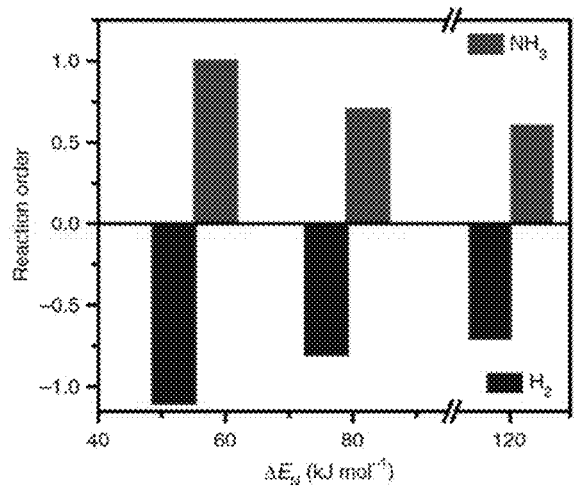
FIG. 11F shows ammonia and hydrogen reaction orders (at 425° C.) versus nitrogen adsorption energies of FIG. 11C for the different fabricated $Co_xMo_yFe_{10}Ni_{10}Cu_{10}$ nanoparticles.

The finding here can be further correlated to the dependence of reaction orders on AEN. As shown in FIG. 11F, the catalysts with weaker N binding energy has higher $NH_3$ order, suggesting that the kinetics of $NH_3$ decomposition is more limited by $NH_3$ activation, or dehydrogenation of the first N—H bond on the $Co_xMo_yFe_{10}Ni_{10}Cu_{10}$ catalysts of higher Co contents. Since the binding strengths of nitrogenous species (*$NH_x$, x=0, 1, 2, and 3) likely scale linearly with each other, the *$NH_x$ species are expected to bind less strongly on the more Co-rich HEA catalysts, which is also in line with the stronger hydrogen inhibition effect found for these catalysts, as shown in FIG. 11F. Thus, the high catalytic activity of $NH_3$ decomposition achieved with the $Co_xMo_yFe_{10}Ni_{10}Cu_{10}$ catalysts can be attributed to the robust tuning of surface adsorption properties, as enabled by the continuous varying of alloy composition (Co/Mo ratio). Noticeably, the optimal value of AEN ~ 79 kJ/mol identified here is consistent with the value (~74 kJ/mol) predicted by density functional theory calculations for the given reaction condition (e.g., 5 vol % of $NH_3$).

Figure 13A:
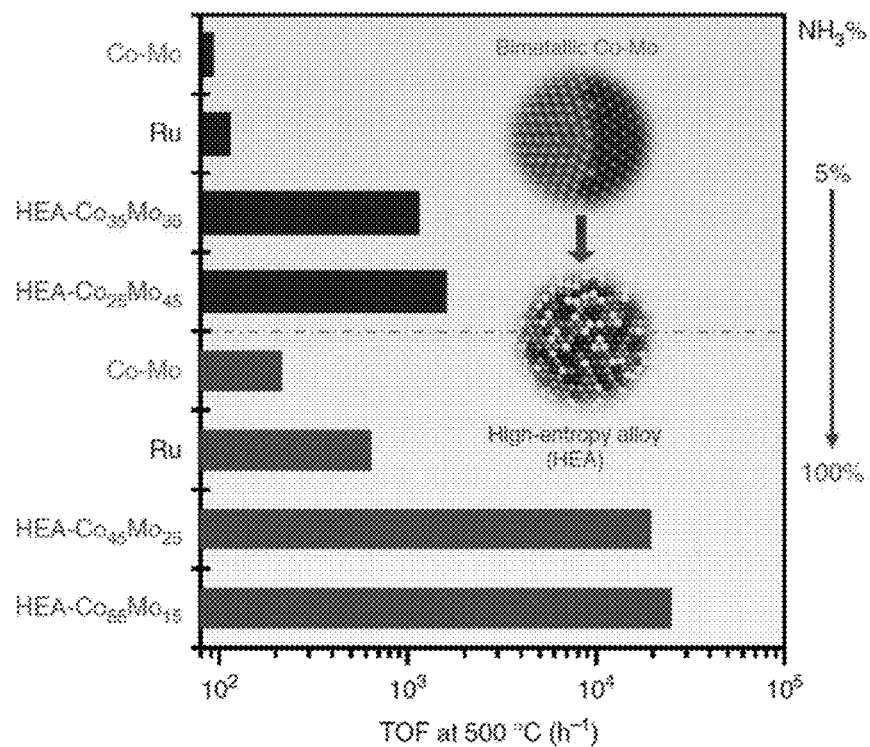
FIG. 13A is a graph illustrating tuning of composition of catalytic nanoparticles, including $Co_xMo_yFe_{10}Ni_{10}Cu_{10}$ nanoparticles, according to ammonia concentration.
Figure 13B:
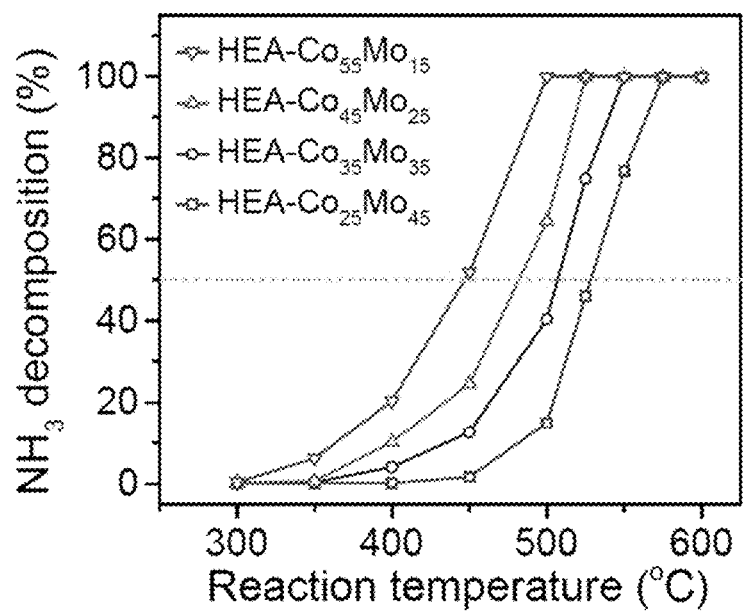
FIG. 13B is a graph of ammonia decomposition versus reaction temperature at a space velocity of 36 L $g_{cata}^{-1}h^{-1}$, for different fabricated $Co_xMo_yFe_{10}Ni_{10}Cu_{10}$ nanoparticles as catalyst.

Moreover, the $Co_xMo_yFe_{10}Ni_{10}Cu_{10}$ catalysts can be readily tailored to achieve a gradual change in nitrogen binding strengths (e.g., so that surface properties are optimized to match the varying concentration of ammonia along the flow), in particular, by simply varying the Co/Mo ratios. For example, $Co_{55}Mo_{15}Fe_{10}Ni_{10}Cu_{10}$ catalysts have been identified to be the best-performing catalyst for the decomposition of pure $NH_3$, which gives rise to catalytic activity improvement factors of ~118 versus bimetallic Co—Mo and ~40 versus Ru, as shown in FIGS. 13A-13B. The even more substantial catalytic enhancements found here (than the results presented above for 5 vol % of $NH_3$) can be well understood in such a way: the AEN value of $Co_{55}Mo_{15}Fe_{10}Ni_{10}Cu_{10}$ (~42 kJ/mol, according to FIG. 11C) is very close to the optimal (~39 kJ/mol) predicted for the reaction at 100 vol % of $NH_3$, whereas the values of previous $Co_3Mo_3N$ and Ru catalysts are quite away from this optimal point.

The correlations among composition, adsorption property and catalytic performance discussed above point to a scaling relationship between AEN and the elemental ratio of Co/Mo (FIG. 11C), which governs the catalytic activity of the $Co_xMo_yFe_{10}Ni_{10}Cu_{10}$ catalysts. This relationship can be ascribed to the presence of well mixed Co—Mo sites on the surface with the ratio being consistent with the bulk compositions (FIG. 4H). To elucidate this surface site mixing mechanism in the $Co_xMo_yFe_{10}Ni_{10}Cu_{10}$ catalysts, atomistic models were used. In particular, $Co_{25}Mo_{45}Fe_{10}Ni_{10}Cu_{10}$ was chosen as the example and modeled in a cuboctahedral shape with FCC lattice. To investigate the phase stability of the $Co_xMo_yFe_{10}Ni_{10}Cu_{10}$ nanoparticles, Monte Carlo (MC) simulations were performed at three different temperatures (i.e., 573, 750, and 1000 K). In the modeling, the five elements were initially randomly assigned to each lattice site according to the nominal composition. The atomic structures after 10 million MC steps are shown in FIGS. 14A-14C. All the resulting structures show random distribution of the five elements, and no apparent chemical ordering (e.g., segregation of single elements or formation of intermetallic phases) was observed, confirming the formation of HEA under the given conditions.

This finding is further corroborated by statistical analysis of the averaged composition of the nearest-neighbor lattice sites (with a cutoff radius of 3.0 Å) for a given element, as shown in FIGS. 15A-15C and 16A-16C. For an ideal solid solution, this averaged composition should be equal to the nominal composition of the HEA nanoparticle, which is represented by the dashed lines in FIGS. 15A-15C and 16A-16C. The nearest-neighbor (NN) compositions averaged over all the atoms only deviate slightly from the nominal composition throughout the three temperatures investigated, implying the absence of long-range chemical ordering. On the other hand, some degree of short-range ordering is predicted in the modeled nanoparticle, with Fe, Co, and Ni atoms exhibiting a relatively higher affinity around Mo atom, while there is a moderate repulsive interaction between Cu—Mo, Fe—Co, Co—Ni, and Co—Cu atom pairs. This short-range ordering is even prominent for surface atoms, as shown in FIGS. 15A-15C and 16A-16C.

Overall, the atomistic modeling reveals that the $Co_xMo_yFe_{10}Ni_{10}Cu_{10}$ nanoparticles have a single solid solution phase with only slight short-range chemical ordering throughout the investigated temperature range. It also confirms the presence of well-mixed surface sites on the $Co_xMo_yFe_{10}Ni_{10}Cu_{10}$ catalysts and suggests that the experimentally observed scaling relationship between the nanoparticle composition and the surface adsorption property can be understood via the surface site mixing mechanism. It should be noted that the atomistic modeling results are consistent with the prediction based on simple thermodynamic calculations, confirming the tendency of the given quinary composition to form a single solid-solution phase. Moreover, the structural similarity at the different temperatures (from 573 to 1000 K) underlines the high thermal stability of the $Co_xMo_yFe_{10}Ni_{10}Cu_{10}$ nanoparticles, consistent with the observation from the catalytic durability studies shown in Table 2.

The thermodynamic properties of $Co_xMo_yFe_{10}Ni_{10}Cu_{10}$ nanoparticles were also confirmed by the calculations. Taking $Co_{25}Mo_{45}Fe_{10}Ni_{10}Cu_{10}$ as an example, the thermodynamic properties were calculated based on empirical data of the atomic size of constituents, formation enthalpy of binary alloy combinations, configuration entropy of the ideal solutions. For example, the parameter ($\delta$) gauging the atomic size difference in the alloys was given by:

$$\delta = \sqrt{\sum_{i=1}^{n} C_i \left(1 - \frac{r_i}{\bar{r}}\right)},$$

where Ci is the atomic percentage of the $i^{th}$ component, $r_i$ is the atomic radius of the $i^{th}$ component, $\bar{r} = \Sigma_{i=1}^{n} C_i r_i$ is the average atomic radius. The enthalpy of mixing of the alloy was given by:

$$\Delta H_{mix} = \sum_{i=1, j>1}^{n} \Omega_{ij} C_i C_j,$$

where $\Omega_{ij} = 4\Delta H_{AB}^{mix}$ is the regular solution interaction parameter between the $i^{th}$ and $j^{th}$ elements, $\Delta H_{AB}^{mix}$ is the enthalpy of mixing of binary liquid alloys. The entropy of mixing of the n-element regular solution was given by:

$$\Delta S_{mix} = -R \sum_{i=1}^{n} C_i \ln C_i,$$

where R is the gas constant. For bulk multi-component alloys to form solid-solution HEAs, the formation can require the parameter gauging the atomic size difference $\delta \leq 6.6\%$ and the enthalpy of formation $-11.6 < \Delta H_{mix} < 3.2$ kJ/mol. For $Co_{25}Mo_{45}Fe_{10}Ni_{10}Cu_{10}$ catalysts, the calculated values were $\delta = 5.4\%$, $\Delta H_{mix} = 0.65$ kJ/mol, and $\Delta S_{mix} = 11.6$ J/(K mol), suggesting that such catalysts form solid-solution HEAs under the $NH_3$ decomposition reaction conditions.

CONCLUSION

Any of the features illustrated or described with respect to FIGS. 1B-16C can be combined with any other features illustrated or described with respect to FIGS. 1B-16C to provide catalysts, catalytic structures, systems, methods, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A catalytic structure comprising:
a plurality of high-entropy alloy (HEA) nanoparticles, each HEA nanoparticle having a maximum cross-sectional dimension less than or equal to 1 μm, each HEA nanoparticle comprising a homogeneous mixture of elements of cobalt (Co), molybdenum (Mo), and at least two transition metal elements,
wherein the homogeneous mixture in each HEA nanoparticle forms a single solid-solution phase, and the at least two transition metal elements are selected from the group of 3d transition metals.

2. The catalytic structure of claim 1, wherein the single solid-solution phase is a face-centered cubic phase.

3. The catalytic structure of claim 1, wherein the homogeneous mixture in each HEA nanoparticle comprises at least three transition metal elements.

4. The catalytic structure of claim 1, wherein each HEA nanoparticle consists of Co, Mo, iron (Fe), nickel (Ni), and copper (Cu).

5. A catalytic structure comprising:
a plurality of high-entropy alloy (HEA) nanoparticles, each HEA nanoparticle having a maximum cross-sectional dimension less than or equal to 1 μm, each HEA nanoparticle comprising a homogeneous mixture of elements of cobalt (Co), molybdenum (Mo), and at least two transition metal elements,
wherein the homogeneous mixture in each HEA nanoparticle forms a single solid-solution phase, and each HEA nanoparticle consists of Co, Mo, iron (Fe), nickel (Ni), and copper (Cu).

6. The catalytic structure of claim 5, wherein the homogeneous mixture in each HEA nanoparticle satisfies $Co_xMo_yFe_aNi_bCu_c$, where $x+y=100-(a+b+c)$, $10 \leq a \leq 20$, $10 \leq b \leq 20$, and $10 \leq c \leq 20$.

7. The catalytic structure of claim 5, wherein the single solid-solution phase is a face-centered cubic phase.

8. A catalytic structure comprising:
a plurality of high-entropy alloy (HEA) nanoparticles, each HEA nanoparticle having a maximum cross-sectional dimension less than or equal to 1 μm, each HEA nanoparticle comprising a homogeneous mixture of elements of cobalt (Co), molybdenum (Mo), and at least two transition metal elements,
wherein the homogeneous mixture in each HEA nanoparticle forms a single solid-solution phase,
the Co, Mo, and the transition elements in the homogeneous mixture have an atomic size difference, δ, that is less than or equal to 6.6%, and
the homogeneous mixture has an enthalpy, $\Delta H_{mix}$, between −11.6 kJ/mol and 3.2 kJ/mol.

9. The catalytic structure of claim 8, wherein the single solid-solution phase is a face-centered cubic phase.

10. The catalytic structure of claim 8, wherein each HEA nanoparticle consists of Co, Mo, iron (Fe), nickel (Ni), and copper (Cu).

* * * * *